United States Patent [19]

Nakhamkin

[11] Patent Number: 5,778,675
[45] Date of Patent: Jul. 14, 1998

[54] METHOD OF POWER GENERATION AND LOAD MANAGEMENT WITH HYBRID MODE OF OPERATION OF A COMBUSTION TURBINE DERIVATIVE POWER PLANT

[75] Inventor: Michael Nakhamkin, Mountainside, N.J.

[73] Assignee: Electric Power Research Institute, Inc., Palo Alto, Calif.

[21] Appl. No.: 879,792

[22] Filed: Jun. 20, 1997

[51] Int. Cl.[6] .................. F01K 3/00; F02C 6/00
[52] U.S. Cl. .................. 60/652; 60/650; 60/659; 60/39.04; 60/39.05; 60/39.17; 60/39.182; 60/39.183; 60/727; 60/728
[58] Field of Search .................. 60/652, 659, 650, 60/682, 39.17, 727, 39.04, 39.05, 39.182, 39.183, 728, 661, 662, 663, 667, 681

[56] References Cited

U.S. PATENT DOCUMENTS

| | | | |
|---|---|---|---|
| 2,621,475 | 12/1952 | Loy | 60/39.04 |
| 3,765,170 | 10/1973 | Nakamura | 60/39.17 |
| 3,831,373 | 8/1974 | Flynt | 60/39.33 |
| 3,988,897 | 11/1976 | Strub | 60/652 |
| 4,100,745 | 7/1978 | Gyarmathy et al. | 60/652 |
| 4,150,547 | 4/1979 | Hobson | 60/659 |
| 4,158,145 | 6/1979 | Kartsounes et al. | 290/52 |
| 4,237,692 | 12/1980 | Ahrens et al. | 60/659 |
| 4,275,310 | 6/1981 | Summers et al. | 290/1 R |
| 4,281,256 | 7/1981 | Ahrens et al. | 290/1 R |
| 4,312,179 | 1/1982 | Zaugg | 60/39.02 |
| 4,347,706 | 9/1982 | Drost | 60/659 |
| 4,353,214 | 10/1982 | Gardner | 60/652 |
| 4,479,355 | 10/1984 | Guide et al. | 60/683 |
| 4,522,024 | 6/1985 | Zaugg | 60/39.05 |
| 4,523,432 | 6/1985 | Frutschi | 60/659 |
| 4,593,202 | 6/1986 | Dickinson | 290/54 |
| 4,630,436 | 12/1986 | Frutschi | 60/39.183 |
| 4,765,142 | 8/1988 | Nakhankin | 60/652 |
| 4,872,307 | 10/1989 | Nakhamkin | 60/39.02 |
| 4,873,828 | 10/1989 | Laing et al. | 60/659 |
| 4,936,098 | 6/1990 | Nakhamkin | 60/652 |
| 5,212,942 | 5/1993 | Malohn | 60/39.17 |
| 5,347,806 | 9/1994 | Nakhamkin | 60/39.161 |
| 5,363,642 | 11/1994 | Frutschi et al. | 60/39.04 |
| 5,386,687 | 2/1995 | Frutschi | 60/39.04 |
| 5,386,688 | 2/1995 | Nakhamkin | 60/39.04 |
| 5,448,889 | 9/1995 | Bronicki | 60/641.14 |
| 5,491,969 | 2/1996 | Cohn et al. | 60/39.05 |
| 5,495,709 | 3/1996 | Frutschi | 60/727 |
| 5,513,488 | 5/1996 | Fan | 60/39.05 |
| 5,537,822 | 7/1996 | Shnaid et al. | 60/659 |
| 5,553,448 | 9/1996 | Farrell et al. | 60/39.161 |
| 5,566,542 | 10/1996 | Chen et al. | 60/39.05 |
| 5,595,059 | 1/1997 | Huber et al. | 60/39.02 |
| 5,632,143 | 5/1997 | Fisher et al. | 60/39.182 |
| 5,634,339 | 6/1997 | Lewis et al. | 60/650 |
| 5,634,340 | 6/1997 | Grennen | 60/652 |

FOREIGN PATENT DOCUMENTS

| | | | |
|---|---|---|---|
| 32 26 429 A1 | 1/1984 | Germany | 60/652 |
| 55-93928 | 7/1980 | Japan | 60/727 |
| 63-208627 | 8/1988 | Japan | 60/727 |
| 2 000 229 | 1/1979 | United Kingdom | 60/652 |

Primary Examiner—Ira S. Lazarus
Assistant Examiner—Ljiljana V. Ciric
Attorney, Agent, or Firm—Farkas & Manelli PLLC; Edward J. Stemberger

[57] ABSTRACT

The invention provides a stand-alone, hybrid combustion turbine derivative power generation system sized for the most efficient and cost-effective base load operation that is also capable of providing, using air storage techniques, short-duration peak power, which is approximately 200% of the base load rating, and short-duration intermediate load power over a whole a range of loads between a base load and a peak load. The peak/intermediate power is also delivered with the best practical efficiency possible. The hybrid system may employ a variety of combustion turbine thermal cycles, including a simple cycle combustion turbine plant, combustion turbine plants with intercooling, reheat, recuperation, steam injection and humidification, and combined cycle power plants.

30 Claims, 12 Drawing Sheets

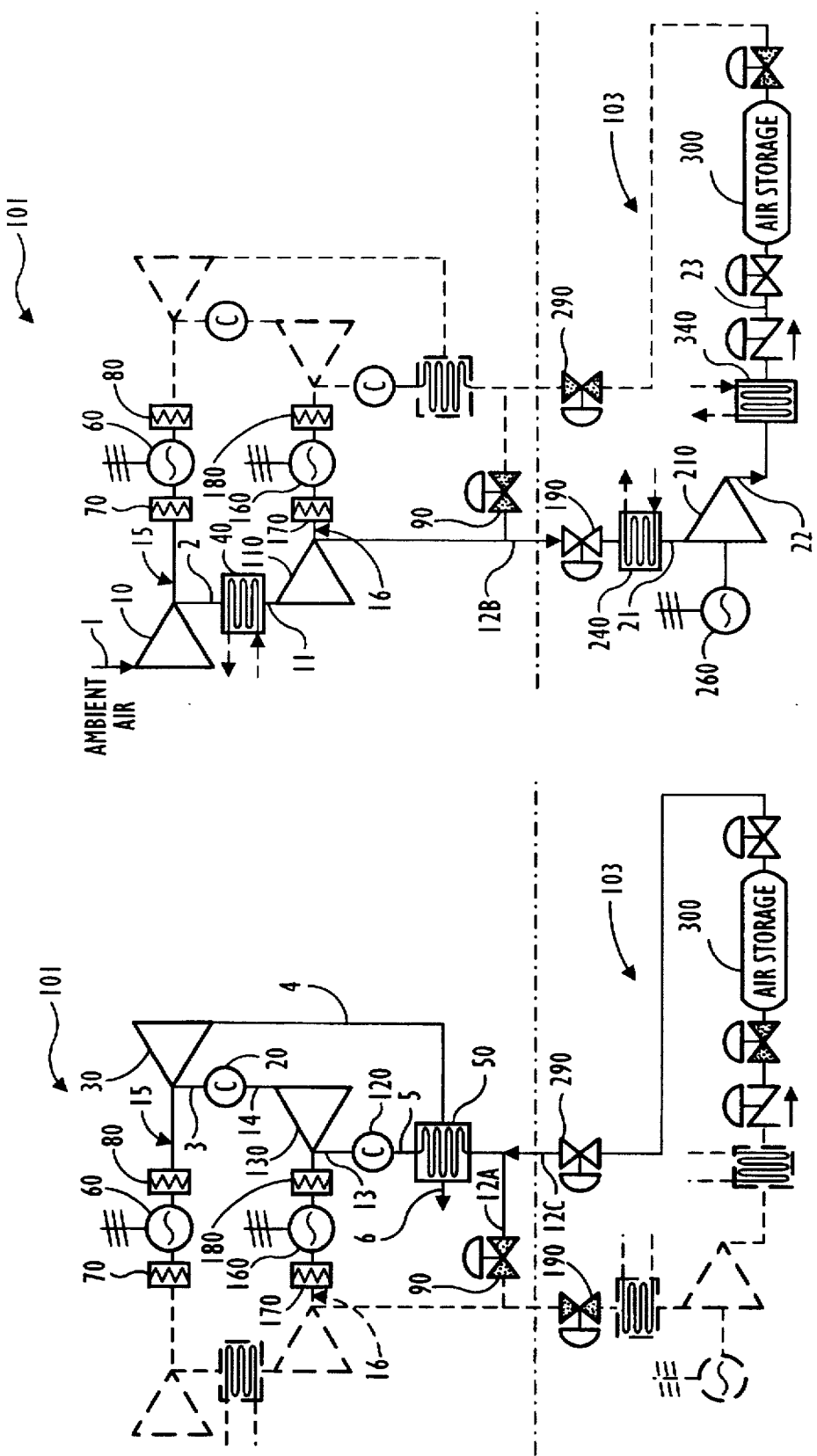

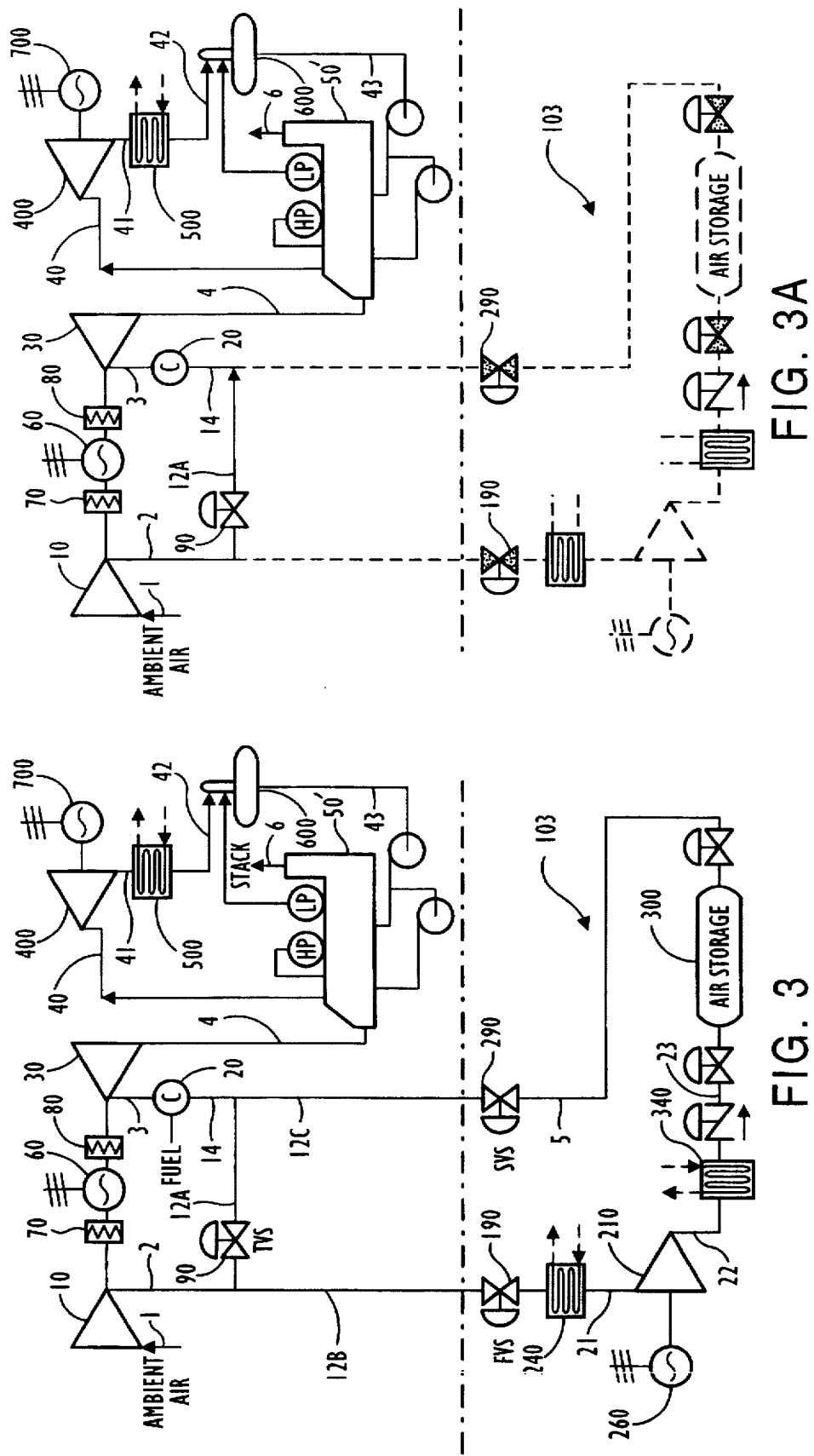

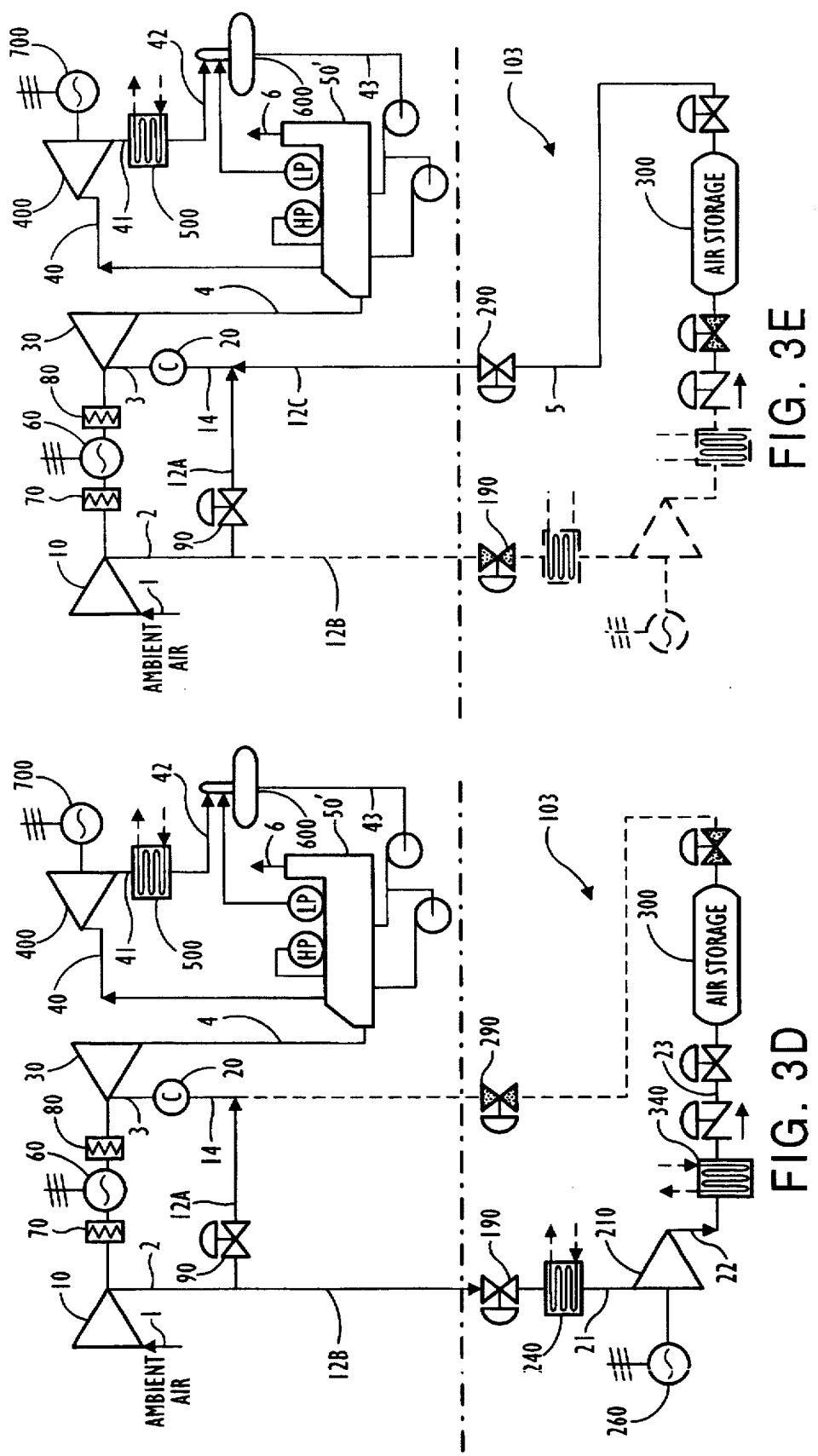

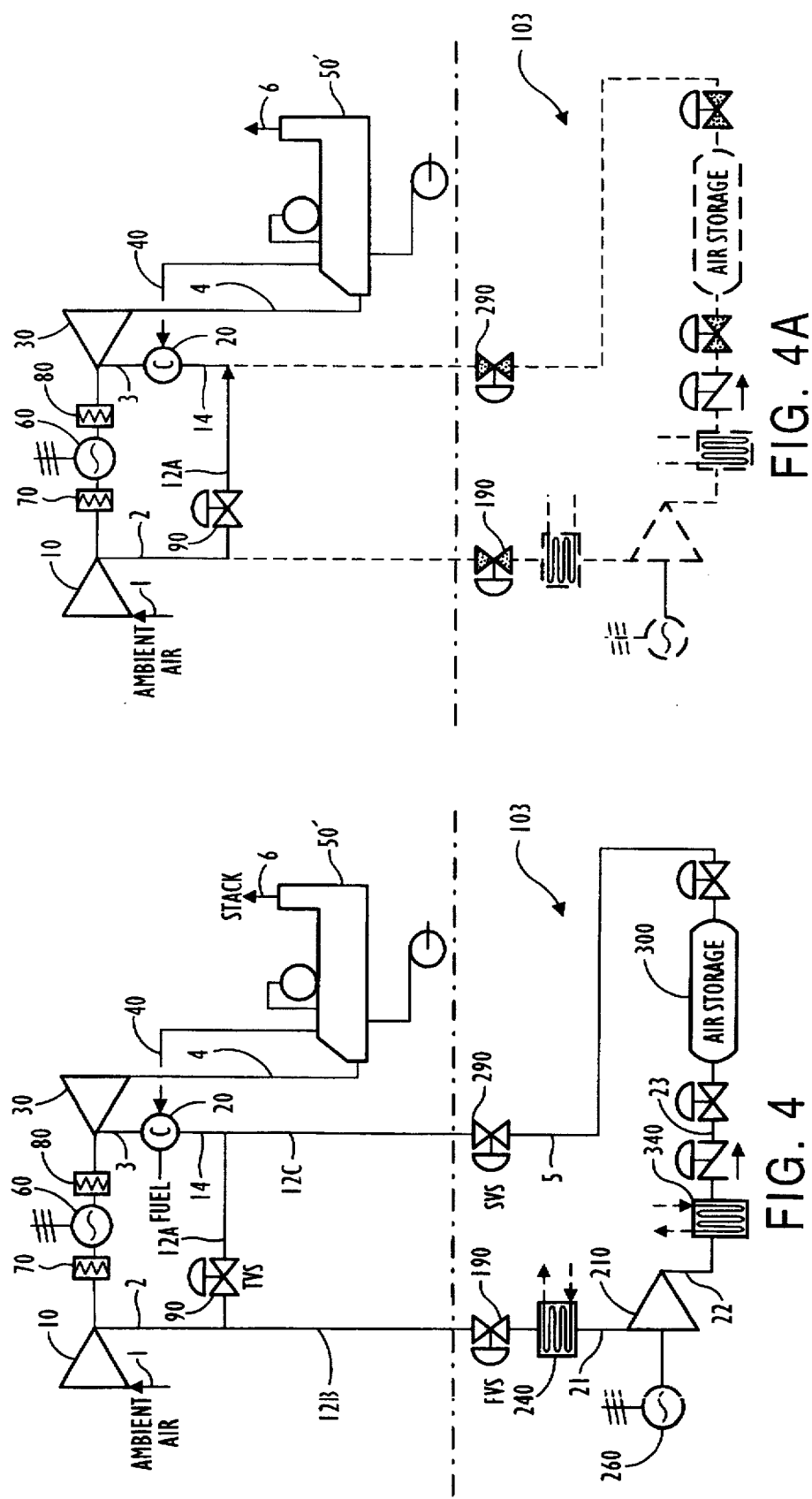

METHOD OF POWER GENERATION AND LOAD MANAGEMENT WITH HYBRID MODE OF OPERATION OF A COMBUSTION TURBINE DERIVATIVE POWER PLANT

BACKGROUND OF THE INVENTION

This invention relates to various configurations of power plants utilizing a variety of combustion turbine thermal cycles, including a simple cycle combustion turbine plant, combustion turbine plants with intercooling, reheat, recuperation, steam injection and humidification, and combined cycle power plants, and more particularly to a combustion turbine derivative power plant optimized for base load operation that is converted to a stand-alone hybrid power plant to be capable of providing, in addition to base load, significantly increased loads to meet short-duration peak/intermediate requirements.

A typical utility has three types of power plants: a) base-load power plants, which are typically large, capital cost-intensive, sophisticated and economical power plants, primarily coal fired or nuclear, designed to satisfy base needs of customers for a continuous operation at close to the rated load power; b) intermediate-load power plants, which are typically combined cycle plants and smaller steam power plants, capable of load swings and frequent restarts; and c) peak power plants, which are typically combustion turbines (with low capital cost per kW and relatively low efficiency), which operate during very limited peak hours with daily start-ups. Also, some large utilities can afford a fourth type of power plant, a load-management plant, typically pump-hydro plant and Compressed Air Energy Storage (CAES) plants. These load management plants use off-peak energy generated by more efficient base-load power plants and convert it into energy of stored water or compressed air, respectively, for a later release (of this energy) for generation of a more expensive peak energy. This above optimal, but capital cost intensive, power generation mix is justified only for a rather large utility with an extensive consumer base and is almost prohibitive for small power generation facilities.

Generally, a small electric power producer sizes a power plant for maximum capacity to meet peak power requirements and is forced to operate most of the time at part load to meet intermediate and base load requirements. This approach results in high installation cost, in inefficient operation and high maintenance. Thus, there is a need for a stand-alone, hybrid power generation system which is capable of meeting this variety of power supply requirements in the most cost effective manner by (1) sizing a combustion turbine derivative power generation system (CTDPGS) for base load operation, with associated reduced installation costs, and modifying the system appropriately, (2) providing an additional system selected to meet intermediate and peaking requirements, and (3) integrating the additional system and modified combustion turbine derivative power generation system to ensure that the resulting hybrid system is capable of providing efficient base load power, peak load power which is approximately 200% of the base load rating, and intermediate load power over a whole a range of loads between a base load and a peak load.

Also, an important application of this invention is its use in utility substations as a means to provide a cost-effective, reliable, uninteruptable power supply. This application is of increasing importance as the utility industry becomes deregulated. This invention will allow simultaneous power generation and energy storage at the utility substation level which provides a reserve in response to network outages.

SUMMARY OF THE INVENTION

An object of the invention is to fulfill the need referred to above. In accordance with the principles of the present invention, this objective and additional objects are attained by providing a method of converting a combustion turbine derivative power generation system, sized for base load operation, into a stand-alone, hybrid power generation system which in addition to base load, is also capable of producing, using air storage techniques, peak power which is approximately double the base load rating and providing an intermediate load power over a whole range of loads between base load and peak load.

The method of the invention includes providing electric power with a combustion turbine derivative power generation system including at least one power shaft assembly having at least one compressor, at least one turbine with a combustor feeding the turbine, and at least one electric generator. All components on the at least one power shaft assembly are connected by drive couplings between the compressor, the turbine and the generator. A CTDPGS may include a heat recovery/power enhancement system including: a recuperator connected to the lowest pressure turbine exhaust to recover its exhaust gas heat for preheating the air upstream of the combustor feeding the turbine of the at least one power shaft assembly; and/or a water heater connected to a recuperator exhaust to preheat water, which along with water preheated in intercoolers, may be injected into an air humidifier (saturator) located upstream of a recuperator for heat recovery and a power augmentation. The system may further include a steam turbine bottoming cycle with a heat recovery steam generator, connected to the lowest pressure turbine exhaust or to a recuperator exhaust, to recover an exhaust gas heat for generation of steam to be expanded through at least one steam turbine, condensed in at least one condenser, deaerated in a deaerator and returned back to a heat recovery steam generator; and/or heat recovery steam generators connected to the lowest pressure turbine exhaust or to a recuperator exhaust to recover an exhaust gas heat for generation of steam to be injected upstream, downstream or into at least one combustor feeding at least one turbine of the at least one power shaft assembly.

The invention includes modifying a CTDPGS, which includes replacing a generator (having a drive coupling) of a power shaft assembly with a double-ended motor/generator (having drive couplings) and automatically controlled clutches on both its ends. The double-ended motor/generator of the power shaft assembly is located between at least one compressor on one end and at least one turbine on another end of the power shaft assembly and is upgraded to meet peaking requirements. The modification also includes ensuring that at the double-ended motor/generator of the power shaft assembly can be driven by the turbine via an engaged automatic turbine driven clutch (ATC) at one end of the at least one power shaft assembly and ensuring that all compressors are driven by the electric motor/generator via an engaged automatic compressor driving clutch (ACC) on the other end of the at least one power shaft assembly.

The inventive method also includes providing an additional compression and compressed air storage system (ACCASS), which consists of: a) an additional shaft assembly comprising a boost compressor, with an intercooler feeding the boost compressor, and at least one electric motor and drive coupling operatively associated with the boost compressor; b) a compressed air storage; and c) piping and valves connecting a modified CTDPGS downstream of the highest pressure compressor of at least one power shaft assembly to an inlet of an intercooler feeding the boost compressor. A discharge of the boost compressor is connected, through an aftercooler, to the compressed air storage and the compressed air storage is connected to the modified CTDPGS upstream of a recuperator.

The invention further includes providing an integration of the modified CTDPGS and an ACCASS into a new Hybrid CTDPGS (HCTDPGS) configuration ensuring three alternative flow path arrangements corresponding to the following operating modes: a) a base load power plant mode of operation, b) a peak/intermediate load power plant mode of operation and c) a compressed air storage recharging (load-management) power plant mode of operation; d) a compressed air storage self-recharging mode, and e) an alternative intermediate load operating mode. The invention provides that a modified CTDPGS is connected to an ACCASS via a first valve system (FVS), which is installed on a path connecting a discharge of the highest pressure compressor of at least one power shaft assembly to an intercooler feeding a boost compressor of at least one additional shaft assembly of an ACCASS. A second valve system (SVS) is installed on the path connecting at the compressed air storage system of an ACCASS to a point on a modified CTDPGS upstream of a recuperator (if applicable) or the highest pressure combustor.

A third valve system (TVS) is located on a path connecting a discharge of the highest pressure compressor of the power shaft assembly with an inlet to the highest pressure combustor of the power shaft assembly between FVS and SVS connections to an ACCASS.

A base load power generation mode of operation of the invention provides that at least one compressor of the at least one power shaft assembly is mechanically connected, via engaged ACC, to, and being driven by, the motor/generator of the at least one power shaft assembly. The motor/generator is driven, via engaged ATC, by at least one turbine of the at least one power shaft assembly, with a combustor feeding a turbine of the at least one power shaft assembly. A flow path arrangement is provided where a modified CTDPGS is disconnected from an ACCASS (FVS and SVS are closed and TVS is open) and is operating as a usual CTDPGS at design point for base load operation with components being integrated into a thermal cycle with an air and gas flow path through all of at least one compressor of the at least one power shaft assembly, with an intercooler feeding a downstream compressor (except for the lowest pressure compressor), through a recuperator and through all of at least one turbine of the at least one power shaft assembly, with a combustor feeding a turbine and through a recuperator to an exhaust stack.

A peak/intermediate load power generation mode of operation of the invention provides that at least one compressor of the at least one power shaft assembly is mechanically disconnected, via disengaged ACC, from the motor/generator of the at least one power shaft assembly. The motor/generator of the at least one power shaft assembly is driven, via engaged ATC, by at least one turbine of the at least one power shaft assembly, with a combustor feeding a turbine. The result of disconnection of at least one compressor of the at least one power shaft assembly allows an increase in power delivered to the electric grid. An air and gas flow path is provided where compressed air previously stored in a compressed air storage system expands sequentially, as a motive fluid, through all turbines of the at least one power shaft assembly. The power generated by the turbine (without power loss to drive the compressor) is delivered to an electric grid, thus significantly increasing the peak/intermediate load power rating of a HCTDPGS to approximately 200% of the base load rating.

A compressed air storage self-recharging operating mode, in accordance with the invention, for a stand-alone HCTDPGS which is not connected to the electric grid, provides for at least one power generation shaft with all components connected similar to a base load operation (ACC and ATC are engaged). An air and gas flow path is provided where air is sequentially compressed in at least one compressor, with an intercooler feeding a downstream compressor (except the lowest pressure compressor), of the at least one power shaft assembly. At this point, the air flow is divided into the storage recharging flow and the motive air flow. The storage recharging flow, via open FVS, goes through the intercooler and at least one boost compressor of an additional shaft assembly, through an aftercooler and into a compressed air storage for storage and later use during peaking/intermediate hours of operation. The motive air flow flows, via open TVS, through a recuperator, through all combustors feeding turbines of the at least one power shaft assembly and then moves through a recuperator to an exhaust stack.

A storage recharging (load-management) mode of operation of the invention provides that when a HCTDPGS is connected to a grid, at least one compressor of the at least one power shaft assembly is mechanically connected, via closed ACC, and driven by the motor/generator of the at least one power shaft assembly. The motor/generator of the at least one power shaft assembly is disconnected, via disengaged ATC, from at least one turbine of the at least one power shaft assembly, with a combustor feeding a turbine. An air path is provided where air is sequentially compressed in at least one compressor, with an intercooler feeding the downstream compressor (except the lowest pressure compressor), of the at least one power shaft assembly. The compressed air passes via open FVS (SVS and TVS are closed) and is further compressed by an electric motor driven boost compressor of an additional shaft assembly and then the compressed air is charged through an aftercooler into a compressed air storage system for storage and later use during peaking/intermediate hours of operation. The electric motor/generator of the power shaft assembly and the motor of the additional shaft assembly can be fed by an electric power from the grid.

In an alternative intermediate load mode of operation of the invention, the mechanical connections and the air and gas path are similar to that of the base/intermediate load operation, the only exceptions are, that at least one compressor of the power shaft assembly operates at part load with reduced air flow (controlled by inlet guide vanes (IGV) or other controlled means) and at least one turbine of the at least one power shaft assembly operates at full power and is fed by both the compressed air flow from at least one compressor of the at least one power shaft assembly and by an additional air flow from the compressed air storage. Thus, the system may operate at an intermediate load increased from base load.

Another object of the invention is to provide stand-alone hybrid power generation system for performing the above modes of operation.

The above and other objects of the present invention will become apparent during the course of the following detailed description and appended claims.

The invention may be best understood with reference to the accompanying drawings wherein illustrative embodiments are shown, and like parts are given like reference numerals.

BRIEF DESCRIPTION OF THE DRAWINGS

FIG. 1B is a schematic diagram of the system of FIG. 1, showing a peak/intermediate load operation;

FIG. 1C is a schematic diagram of the system of FIG. 1, showing compressed air storage charging using off-peak energy (load management operation);

FIG. 3 is a schematic diagram of a third illustrative embodiment of a hybrid combustion turbine derivative electric power generation system, according to the present invention;

FIG. 3A is a schematic diagram of the system of FIG. 3, showing a base load operation;

FIG. 3D is a schematic diagram of the system of FIG. 3, showing compressed air storage charging with a power generated by the HCTDPGS;

FIG. 3E is a schematic diagram of the system of FIG. 3, showing an alternative intermediate load operation;

FIG. 4 is a schematic diagram of a fourth illustrative embodiment of a hybrid combustion turbine derivative electric power generation system, according to the present invention;

FIG. 4A is a schematic diagram of the system of FIG. 4, showing a base load operation;

DETAILED DESCRIPTION OF THE PRESENTLY PREFERRED EXEMPLARY EMBODIMENTS

Figure 1A:
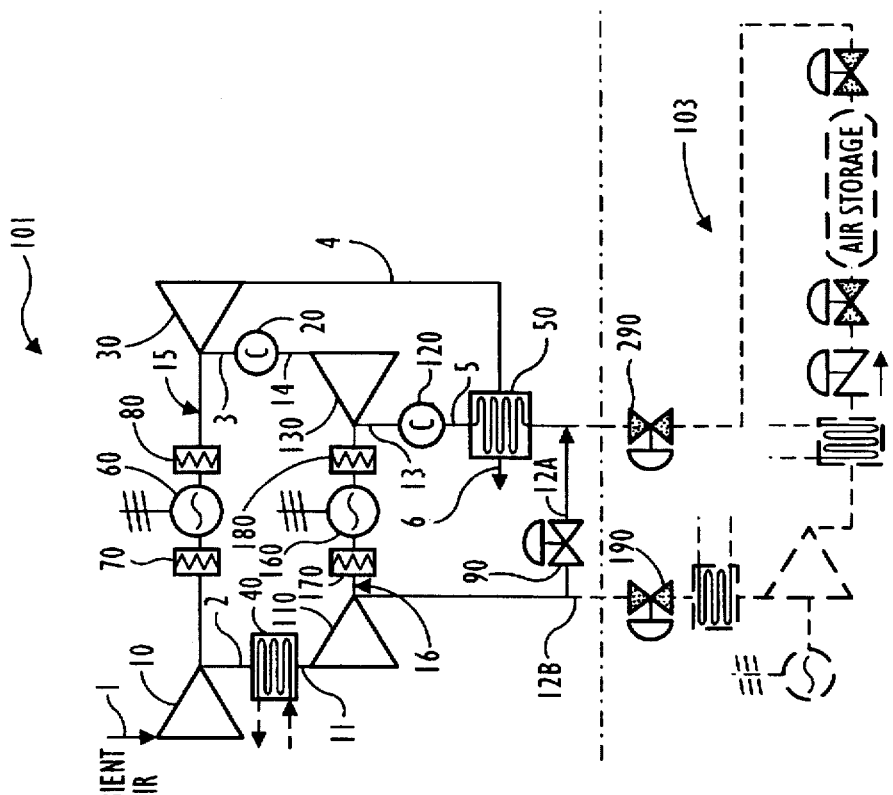
FIG. 1A is a schematic diagram of the system of FIG. 1, showing a base load operation.
Figure 1:
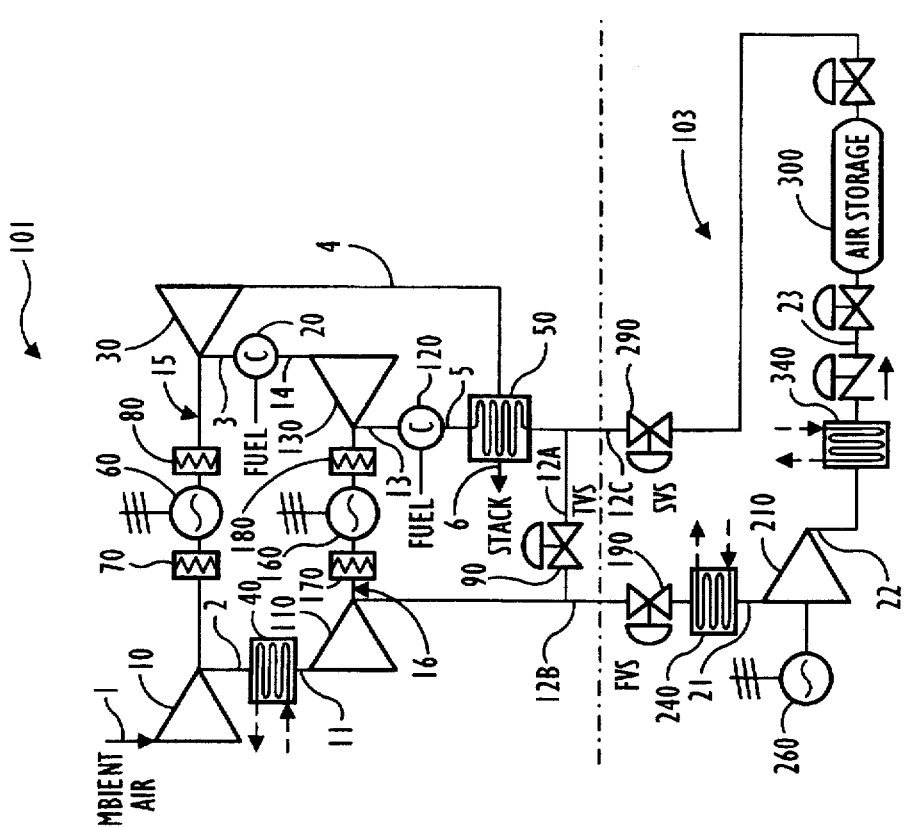
FIG. 1 is a schematic diagram of a first illustrative embodiment of a hybrid combustion turbine derivative electric power generation system (HCTDPGS), according to the present invention.

Referring to the drawings, FIG. 1 is a schematic diagram of a first illustrative embodiment of a stand-alone, hybrid combustion turbine derivative electric power generation system (HCTDPGS), generally indicated at 101, provided in accordance with the principles of the present invention. FIGS. 1A, 1B, 1C, 1D and 1E illustrate the following operations of a HCTDPGS, respectively: a base load operation, a peaking/intermediate operation, a compressed air storage recharging with the use of off-peak energy from an electric grid (load management operation), a compressed air storage recharging by a stand-alone HCTDPGS, and alternative intermediate load operation, as will be explained in more detail below.

The first embodiment of a HCTDPGS (FIG. 1) presents a modified CTDPGS, which, for illustrative purpose only, is a generic two-shaft combustion turbine with intercooling, reheat and recuperation optimized for base load operation in combination with an additional air compression and compressed air storage system. It can be appreciated that the modified CTDPGS may have a multitude of shafts and multitude of components on each shaft, as, for example, disclosed in U.S. Pat. No. 5,386,688, the content of which is hereby incorporated by reference into the subject specification.

The HCTDPGS 101 includes a modified CTDPGS having a low pressure power shaft assembly, generally indicated at 15, consisting of at least one compressor 10, at least one turbine 30, a combustor 20, which feeds the heated combustion product gas to a turbine 30. The CTDPGS is modified by replacing the standard generator with a double-ended electric motor/generator 60 having two automatic clutches, automatic compressor driving clutch (ACC) 70 at a compressor end and an automatic turbine driving clutch (ATC) 80 on a turbine end of the shaft assembly 15. The motor/generator is upgraded to meet peaking requirements for the system. The motor/generator and clutches are conventional, as disclosed, for example, in U.S. Pat. No. 4,765,142, the content of which is hereby incorporated by reference into the present specification. The turbine 30 via engaged ATC 80 and ACC 70 drives the electric motor/generator 60 and the compressor 10, respectively. In the illustrated embodiment, the high pressure shaft assembly, generally indicated at 16, has the identical configuration of the low pressure shaft 15 and consists of at least one compressor 110, at least one turbine 130, a combustor 120, which feeds the heated combustion product gas to a turbine 130, and a double-ended motor/generator 160 having two automatic clutches ACC 170 and ATC 180. The turbine 130 via engaged ATC 180 and ACC 170 drives the electric motor/generator 160 (also upgraded to meet peaking requirements) and the compressor 110. In the illustrated embodiment, a heat recuperator 50 is provided. It is within the contemplation of this invention that the heat recuperator can be a chemical recuperator. In addition, an intercooler 40, cooled by air or water, may also be included. It can be appreciated that not every power shaft assembly of the system is obligated to have a combustor.

The system 101 also includes an additional air compression and compressed air storage system (ACCASS), generally indicated at 103 (the system shown generally below the dotted line in FIG. 1). The additional system 103 includes an intercooler 240, at least one boost compressor 210 and an electric motor 260 coupled to the boost compressor 210 to drive the boost compressor. Also, the additional system 103 includes an aftercooler 340 and a compressed air storage 300. A first valve system (FVS) 190, a second valve system (SVS) 290 and a third valve system (TVS) 90 provide for various flow arrangements to facilitate the inventive methods of the HCTDPGS operations, as will be explained below. The air storage 300 may be high pressure piping, a pressure vessel, a reinforced concrete structure, an underground geological formation, such as salt, hard rock and aquifers, or any structure capable of storing compressed air. The valve system are conventional and may include a plurality of controllable valves. It can be appreciated that the integration of the modified CTDPGS and with the ACCASS results in the inventive HCTDPGS 101.

For a base load mode of operation, as shown in FIG. 1A, the air and gas path is typical for a combustion turbine and extends through the low pressure compressor 10 of the low pressure power shaft assembly 15, through the intercooler 40 and compressor 1 10 of the high pressure power shaft assembly 16, through the recuperator 50, through the combustor 120 and expansion turbine 130 of the high pressure power shaft assembly 16, and then through the combustor 20 and expansion turbine 30 of the low pressure power shaft assembly 15. Thus, the discharge 2 of the low pressure compressor 10 passes through the intercooler 40, which reduces the discharge air temperature at the inlet 11 of the high pressure compressor 110. The pressure of the air is then again raised and the discharge 12 of the high pressure compressor 110 is provided, via the bypass structure or path 12A and the open TVS 90, as an input to the heat recuperator 50. The outlet 5 of the heat recuperator 50 is connected to the high pressure combustor 120, whose outlet 13 is provided to the high pressure expansion turbine 130. The exhaust 14 of the high pressure expansion turbine 130 is heated in the low pressure combustor 20 and then provided to the inlet 3 of the low pressure expansion turbine 30. The exhaust 4 of the low pressure expansion turbine 30 is utilized as a heat source for the heat recuperator 50, before going to the system exhaust 6. The modified CTDPGS is disconnected by the air flow path from the additional ACCASS 103 and FVS 190 and SVS 290 are closed, while TVS 90 is open.

The base load operating mode requires all automatic clutches on the low and high pressure power shaft assemblies to be engaged. Accordingly, on the low pressure power shaft assembly 15, ACC 70 and ACT 80 are engaged, and on the high pressure power shaft assembly 16, ACC 170 and ACT 180 are engaged. Thus, on both the low and high pressure power shafts, expansion turbines 30 and 130 via engaged ACTs 80 and 180 are mechanically connected to corresponding double-ended motor/generators 60 and 160, respectively, and these motor/generators are mechanically connected to corresponding compressors 10 and 110 via the engaged ACCs 70 and 170.

The power generated by the low and high pressure expansion turbines 30 and 130 is partially consumed for driving the low and high pressure compressors 10 and 110, respectively, and the remaining power (minus losses) on each power shaft assembly 15 and 16 goes for electric power generation. The modified CTDPGS plant's thermal cycle is optimized for the most efficient base load operation, and, in spite of modifications associated with the conversion to HCTDPGS, the plant has operating characteristics (electric power generated and efficiency) generally identical to the original CTDPGS plant. Based on various practical and economic considerations, it is within the contemplation of the invention to have a multitude of power shafts and a variable number of compressors and turbines on each shaft in various arrangements. This is true for all embodiments of the invention disclosed herein.

The HCTDPGS provides a way of substantially increasing power generation above the optimized base load by intermittently disengaging compressors of power shaft assemblies and using stored compressed air. Thus, in a peak/intermediate load operating mode, as shown on FIG. 1B, the air and gas flow path is originated with the compressed air stored in the air storage 300, through the recuperator 50, through the combustor 120 and expansion turbine 130 of the high pressure shaft assembly, and then through the combustor 20 and expansion turbine 30 of the low pressure power shaft assembly. Thus, the compressed air, stored in the air storage 300, passes through the open SVS 290 in the connection structure 12C to the inlet of the recuperator 50. The outlet 5 of the heat recuperator 50 is connected to the high pressure combustor 120, whose outlet 13 is provided to the high pressure expansion turbine 130. The exhaust 14 of the high pressure expansion turbine 130 is heated in the low pressure combustor 20 and then provided to the inlet 3 of the low pressure expansion turbine 30. The exhaust 4 of the low pressure expansion turbine 30 is utilized as a heat source for the heat recuperator 50, before going to the system exhaust 6. During the peak/intermediate load method of operation the FVS 190, connecting the high pressure compressor 110 discharge 12 to the ACCASS 103, and the TVS 290, connecting the high pressure compressor 110 discharge 12 to the recuperator inlet 12A, are closed; the SVS 290, connecting the storage 300 to the recuperator inlet 12C, is open.

A peak/intermediate load operating mode requires, on each of the two shaft assemblies, a mechanical connection of expansion turbines to corresponding electric motor/generators (both ACTs 80 and 180 are engaged) and mechanical disconnection of all compressors from corresponding motor/generators (both ACCs 70 and 170 are disengaged). Thus, during peak/intermediate operation all power of the expansion turbines 30 and 130, on both power generation shaft assemblies 15 and 16, goes for electric power generation (no power is used for compressor driving), thus a maximum peak/intermediate power generated by the HCTDPGS almost doubles the base load power rating of the original CTDPGS, and in some cases even more than doubles it. The ACCASS 103 is optimized for specific peak/intermediate power and energy requirements and specific system economics. Thus, the air storage 300 size and cost are primarily affected by the mass of the compressed air to be stored, i.e. the amount of uninterrupted peak/intermediate energy to be delivered by the HCTDPGS, and by the cavern recharging regimes. Also, the air storage 300 size and cost are affected by the pressure ratio of the boost compressor 210; thus the boost compressor's optimum pressure ratio is different for different compressed air storage types: for example, an analysis indicates that for the compressed air storage in above-ground prefabricated high pressure piping or pressure vessels, the optimum pressure ratio of the boost compressor shall be approximately six (6) and much lower for the compressed air storage in underground formations (hard rock, salt, aquifers). It shall be noted, that expansion turbines driving electric motor/generators, on both power shaft assemblies (with disconnected compressors), have very flat efficiency vs. load curves, i.e. a HCTDPGS operates at a very high efficiency over a whole range of intermediate loads up to a maximum peak load.

Thus, the HCTDPGS can produce a peak power, which is approximately 200% of base load, by disengaging compressors and by feeding expansion turbines with the stored compressed air. The compressed air storage can be easily refilled during off-peak hours either with a use of an inexpensive off-peak energy (thus, providing a load-management of base-load plants) or by self-charging, as explained more fully below.

A feature of the invention is that the stand-alone HCTDPGS, which is not connected to the electric grid, ensures compressed air storage charging or recharging. As shown in FIG. ID, an air flow path extends through the low pressure compressor 10 of the low pressure power shaft assembly 15 and through the intercooler 40 and compressor 110 of the high pressure power shaft assembly 16. At this point the air flow is divided into the storage recharging flow and the motive air flow. The storage recharging flow goes through the intercooler 240 and boost compressor 210 of the ACCASS 103, through the aftercooler 340 and into the compressed air storage 300, while the motive air flow goes through the recuperator 50, through the combustor 120 and expansion turbine 130 of the high pressure shaft assembly 16, and then through the combustor 20 and expansion turbine 30 of the low pressure power shaft assembly 15. Thus, the discharge 2 of the low pressure compressor 10 passes through the intercooler 40, which reduces the discharge air temperature at the inlet 11 of the high pressure compressor 110. The pressure of the air is then again raised and the discharge air 12 of the high pressure compressor 110 is divided between the storage 300 recharging air flow through the path 12B and the motive air flow through the path 12A. The storage recharging air flow path is as follows: the air flows through the partially open FVS 190 through the flow path structure 12B, through the intercooler 240, the cooled air is then delivered to the inlet 21 of the boost compressor 210, and the boost compressor discharge 22 passes through the aftercooler 340 and connection 23, with a non-return isolation valve 24, into the compressed air storage 300. The motive air and gas flow path is as follows: the air flows through the bypass structure 12A and partially open TVS 90 feeding the input 12A to the recuperator 50; the outlet 5 of the heat recuperator 50 is connected to the high pressure combustor 120, whose outlet 13 is provided to the high pressure expansion turbine 130. The exhaust 14 of the high pressure expansion turbine 130 is heated in the low pressure combustor 20 and then provided to the inlet 3 of the low pressure expansion turbine 30. The exhaust 4 of the low pressure expansion turbine 30 is utilized as a heat source for the heat recuperator 50, before going to the system exhaust 6. A portion of the electric power generated is used to power the electric motor 260 to drive the boost compressor 210.

The minimum air flow via TVS 90 through the bypass structure 12A and to the inlet of recuperator 50 is determined by a requirement for expansion turbines 30 and 130 to drive compressors 10 and 110, respectively, and the electric motor driven boost compressor 210. The remaining compressed air flow will go to flow path structure or line 12B and via FVS 190 to the intercooler 240, the booster compressor 210 and, via the aftercooler 340, to the compressed air storage 300.

Alternatively, the HCTDPGS may operate in a manner similar to a CAES system by providing an operating mode for compressed air storage charging or recharging with the use of off-peak energy from the electric grid (load management operation). This operation is shown in FIG. 1C where an air flow path is provided where the air flow extends through the low pressure compressor 10 of the low pressure power shaft assembly 15, through the intercooler 40 and compressor 110 of the high pressure power shaft assembly 16, through the intercooler 240 and the boost compressor 210 of the ACCASS 103, through the aftercooler 340 and into the compressed air storage 300. Thus, the discharge 2 of the low pressure compressor 10 passes through the intercooler 40, which reduces the discharge air temperature at the inlet 11 of the high pressure compressor 110. The pressure of the air is then again raised and the discharge 12 of the high pressure compressor 110 is provided through flow path structure 12B to the open FVS 190 and to the intercooler 240. The cooled air is then delivered to the inlet 21 of the boost compressor 210, and the boost compressor discharge 22 passes through an aftercooler 340 and connection 23, with a non-return isolation valve 24, into the compressed air storage 300. During this operation, compressors 10 and 110 of the CTDPGS are connected by the air flow to the ACCASS 103, the FVS 190 is open, and the SVS 290 and the TVS 90 are closed. The storage recharging operating method requires mechanical disconnection of expansion turbines from corresponding electric motor/generators (both ACTs 80 and 180 are disengaged) and mechanical connection of all compressors to corresponding electric motor/generators (both ACCs 70 and 170 are engaged). Also, both electric motor/generators 60 and 160 and the electric motor 260 are connected to and fed by the electric grid. Thus, the electric motor/generators, use low cost, off-peak energy (generated by large nuclear or coal fired plants with the lowest cost of electricity) for driving of compressors 10 and 110 and the boost compressor 210 in order to recharge the air storage 300 to the maximum storage pressure.

Figure 1E:
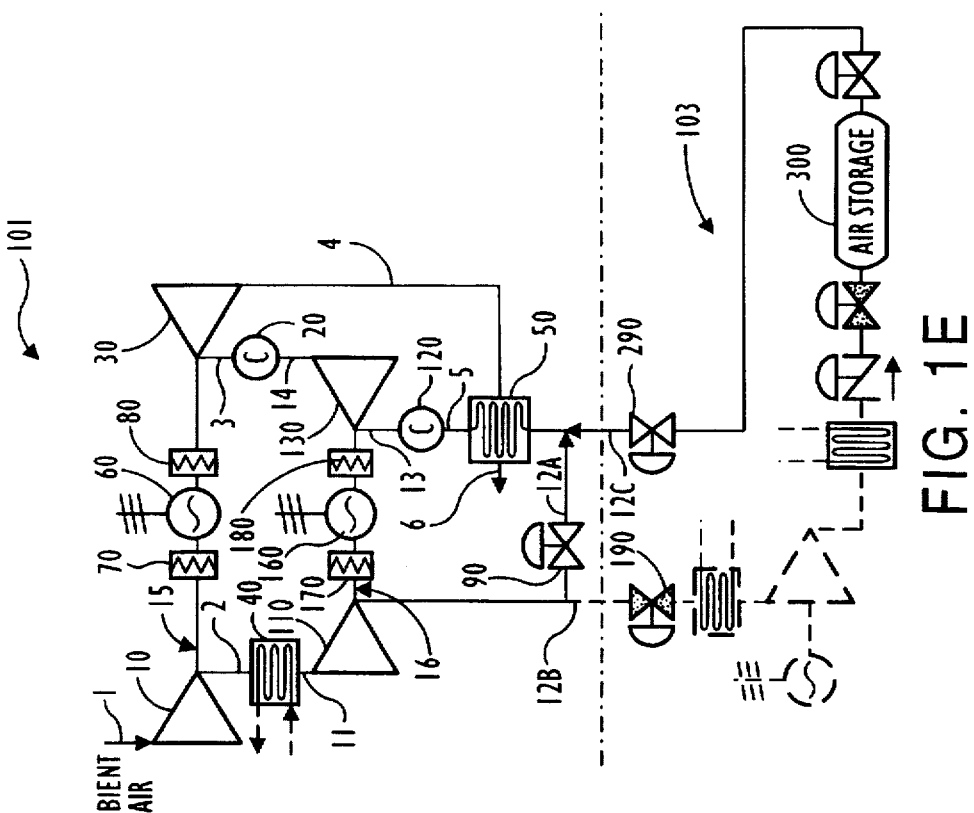
FIG. 1E is a schematic diagram of the system of FIG. 1, showing an alternative intermediate load operation.
Figure 1D:
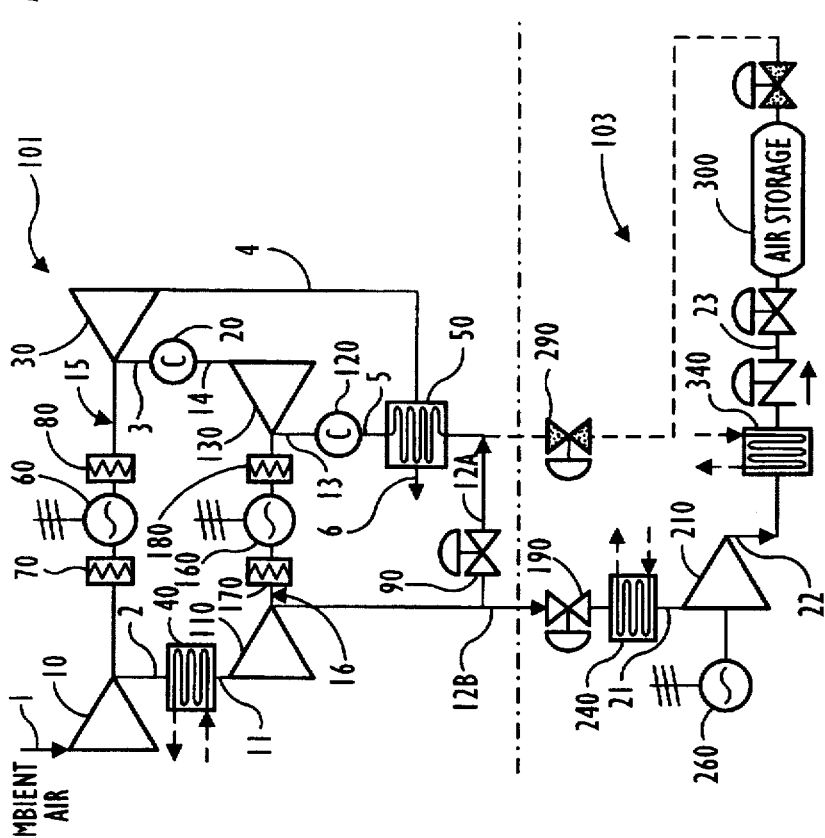
FIG. 1D is a schematic diagram of the system of FIG. 1, showing compressed air storage charging with a power generated by the HCTDPGS.

For an alternative intermediate load method of operation producing power higher than that of a base load operation, as shown on FIG. 1E, the air and gas path is similar to that of the base load operation, the only exceptions are, that low and high pressure compressors operate at part load with reduced air flows (controlled by inlet guide vanes (IGV, not shown) and/or other controlled means), and expansion turbines operating at full power are fed by both the compressed air flow from low and high pressure compressors and by the flow from the compressed air storage. The air and gas flow path extends through the low pressure compressor 10 of the low pressure power shaft assembly 15, through the intercooler 40 and compressor 110 of the high pressure power shaft assembly 16. At this point the air flow path is complemented by the air flow from the compressed air storage 300 and a full capacity motive air flow moves through the recuperator 50, through the combustor 120 and expansion turbine 130 of the high pressure shaft assembly 16, and then through the combustor 20 and expansion turbine 10 of the low pressure power shaft assembly 15. Thus, the discharge 2 of the low pressure compressor 10 passes through the intercooler 40, which reduces the discharge air temperature at the inlet 11 of the high pressure compressor 110. The pressure of the air is then again raised and the discharge 12 of the high pressure compressor 110 is provided (via open the TVS 90 and the bypass structure 12A) as an input to the heat recuperator 50. The stored air stream flows from the compressed air storage 300, through open the SVS 290 and connection structure or path 12C and then is combined at the coupling location with the air flow through the bypass structure 12A upstream of the recuperator 50. The outlet 5 of the heat recuperator 50 is connected to the high pressure combustor 120, whose outlet 13 is provided to the high pressure expansion turbine 130. The exhaust 14 of the high pressure expansion turbine 130 is heated in the low pressure combustor 20 and then provided to the inlet 3 of the low pressure expansion turbine 30. The exhaust 4 of the low pressure expansion turbine 30 is utilized as a heat source for the heat recuperator 50, before going to the system exhaust 6. The control valve systems are positioned as follows: the FVS 190 is closed; the SVS 290 and TVS 90 are open.

The alternative intermediate load operation mode requires all automatic clutches on low and high pressure power shaft assemblies to be engaged. Thus, on the low pressure power shaft assemblies the ACC 70 and the ACT 80 are engaged and on the high pressure power shaft assemblies ACC 170 and ACT 180 are engaged. Thus, on both the low and high pressure power shaft assemblies, expansion turbines via engaged ACTs are mechanically connected to corresponding double-ended motor/generators and the latter, via the engaged ACCs, are mechanically connected to corresponding compressors.

The power generated by expansion turbines 30 and 130 is partially consumed for driving the compressors 10 and 110 and the rest of the power (minus losses) goes for electric power generation by the motor/generators 60 and 160. The major difference between the base load and intermediate load operations is that for the latter operation, compressors 10 and 110 operate at part load with a reduced air flow and, correspondingly, reduced power consumption, while expansion turbines 30 and 130 are fed by a full capacity motive air flow and produce full power. Thus, electric generators 60 and 160 produce an electric power which is higher than the base load power. The electric power delivered by HCTDPGS over the range of intermediate loads is controlled by positioning of the SVS 290, the TVS 90 and IGV, all affecting the proportioning of the air flows upstream of the recuperator 50; the higher the fraction of the flow from the storage 300 the higher the power output by motor/generators 60 and 160.

Figure 2A:
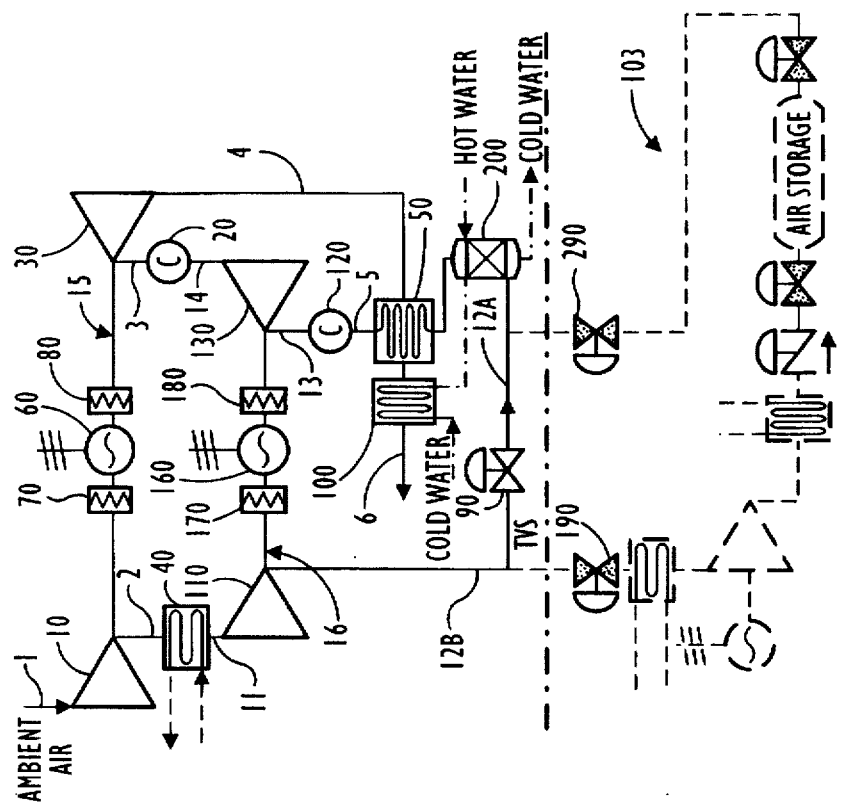
FIG. 2A is a schematic diagram of the system of FIG. 2, showing a base load operation.
Figure 2:
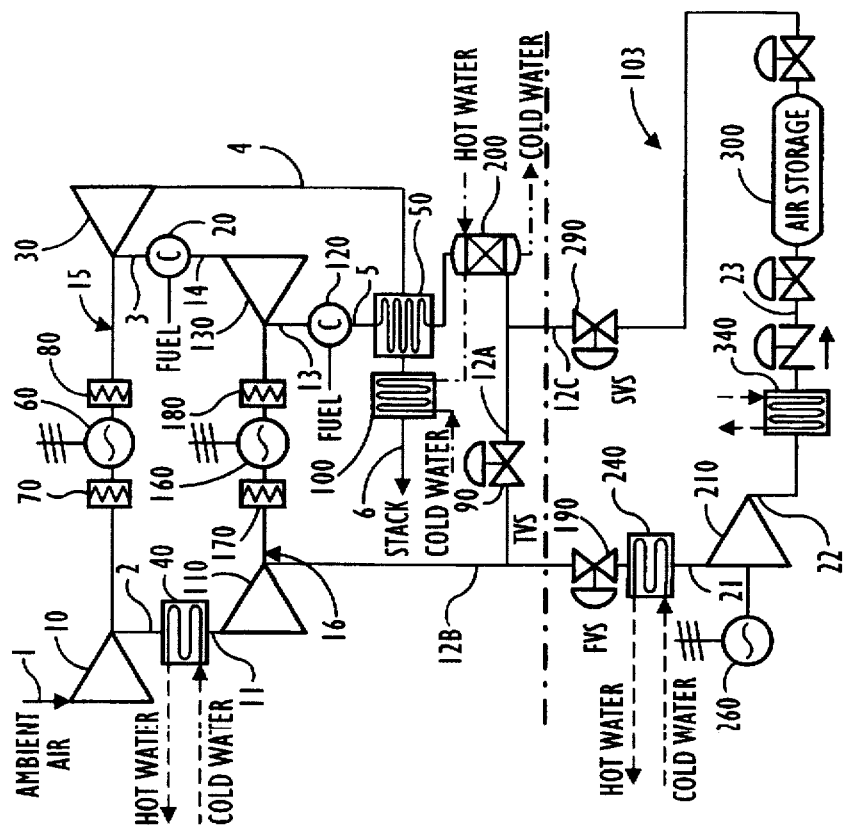
FIG. 2 is a schematic diagram of a second illustrative embodiment of a hybrid combustion turbine derivative electric power generation system, according to the present invention.
Figure 2C:
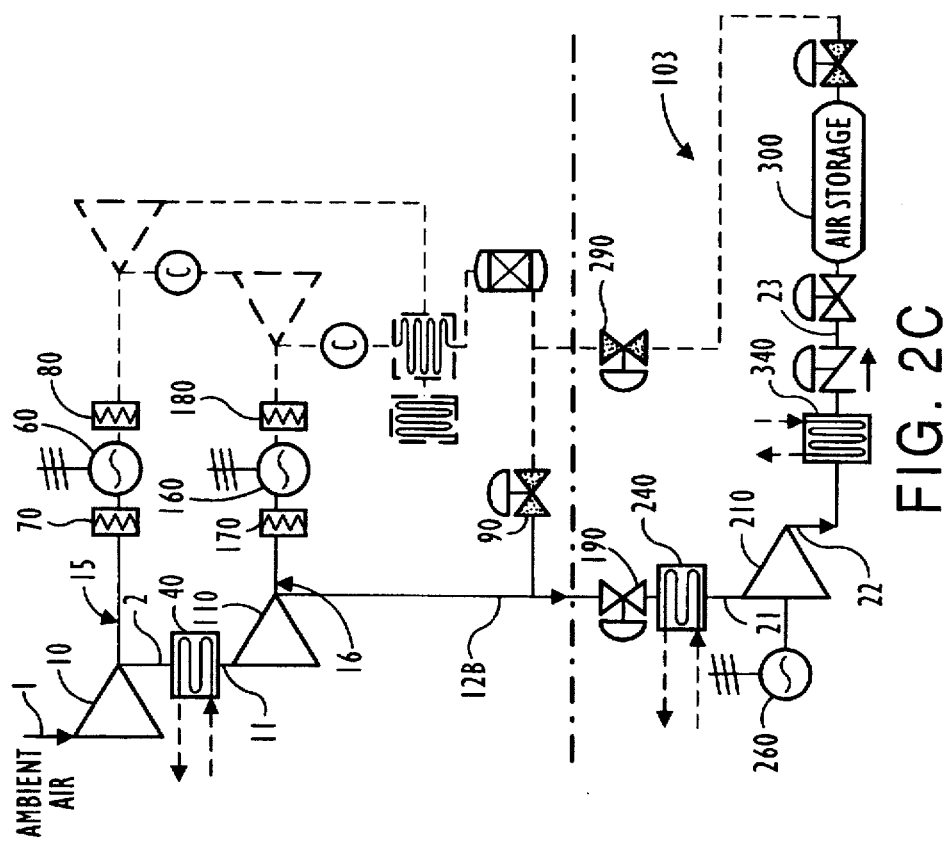
FIG. 2C is a schematic diagram of the system of FIG. 2, showing compressed air storage charging using off-peak energy (load management operation)
Figure 2B:
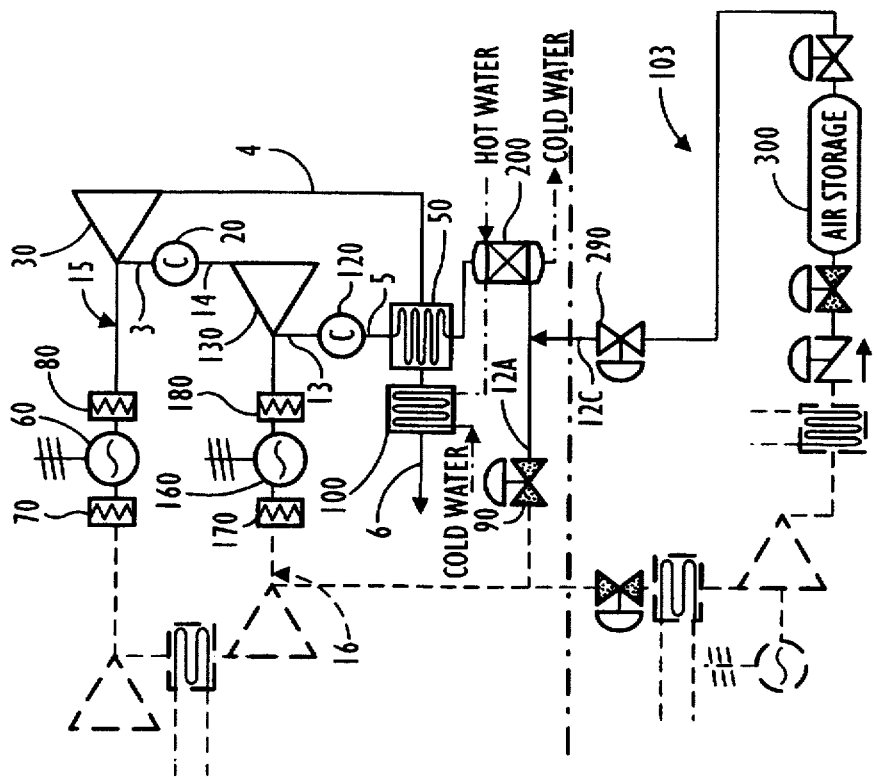
FIG. 2B is a schematic diagram of the system of FIG. 2, showing a peak/intermediate load operation.
Figure 2E:
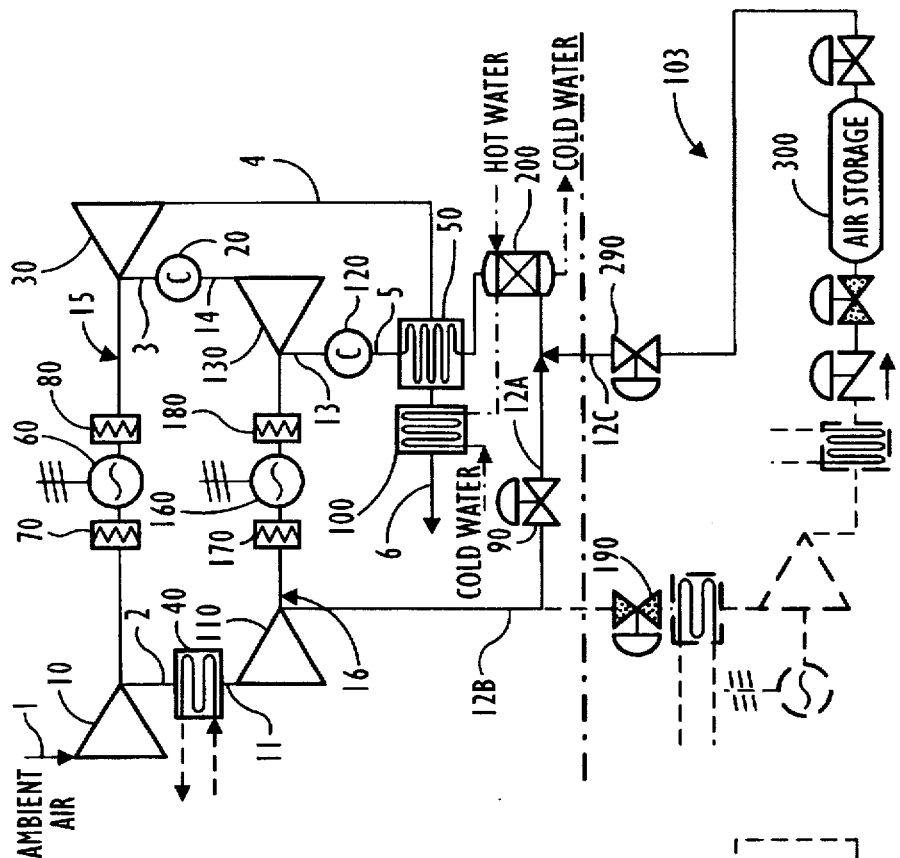
FIG. 2E is a schematic diagram of the system of FIG. 2, showing an alternative intermediate load operation.
Figure 2D:
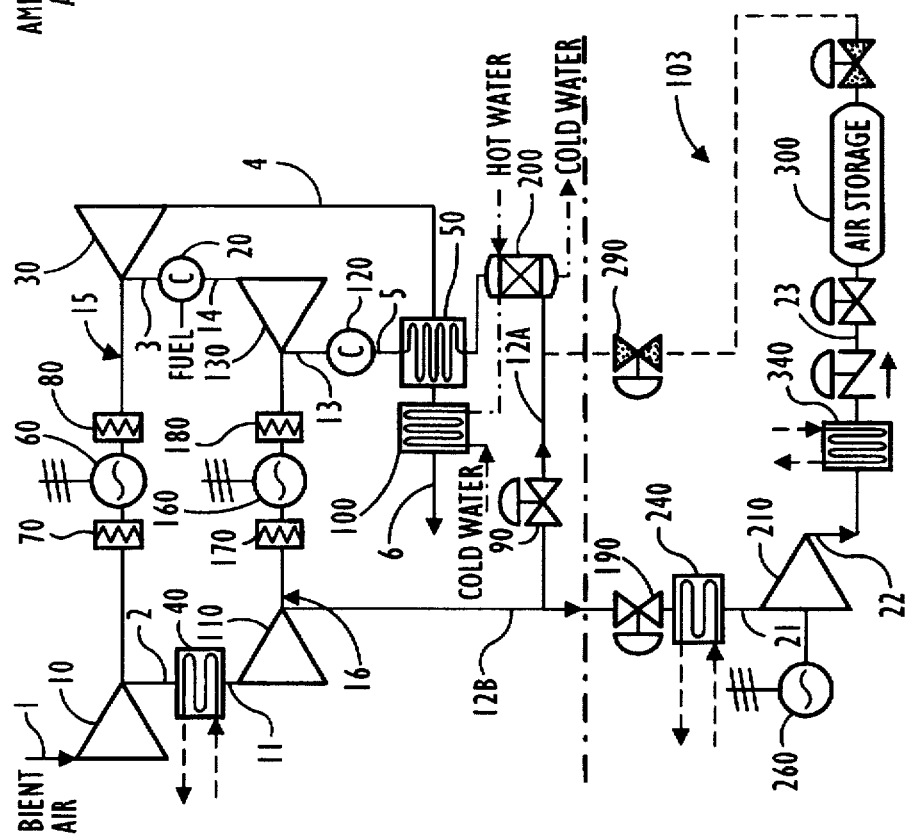
FIG. 2D is a schematic diagram of the system of FIG. 2, showing compressed air storage charging with a power generated by the HCTDPGS.

FIG. 2 illustrates a second embodiment of HCTDPGS of the invention, with a modification to the system shown in FIG. 1. In accordance with the principles of the invention, the system of FIG. 2 further includes a saturator 200 connected between the output of the high pressure compressor 110 and the inlet of the recuperator 50. Thus, from the outlet 12 of the high pressure compressor 110 the compressed air is directed via TVS 90 into the inlet of the saturator 200, where the compressed air is saturated with hot water and preheated before entering the recuperator 50. The remainder of the humidified air and gas path (through the high and low pressure combustors feeding respective turbines) is identical to FIG. 1. The saturator 200 is fed by the hot water, which had been heated in intercooler 40 and in the exhaust gas heat recovery water heater 100. The water flow paths including pumps are readily apparent from FIG. 2.

FIGS. 2A, 2B, 2C, 2D and 2E are self-explanatory, in view of the description given above with regard to the first embodiment of the invention, and illustrate the following inventive modes of operation of the second embodiment of the HCTDPGS, respectively: a base load operation, a peaking/intermediate operation, a storage recharging operation using off-peak energy from an electric grid (load management operation), a compressed air storage recharging by a stand-alone HCTDPGS, and alternative intermediate load operation.

Figure 3C:
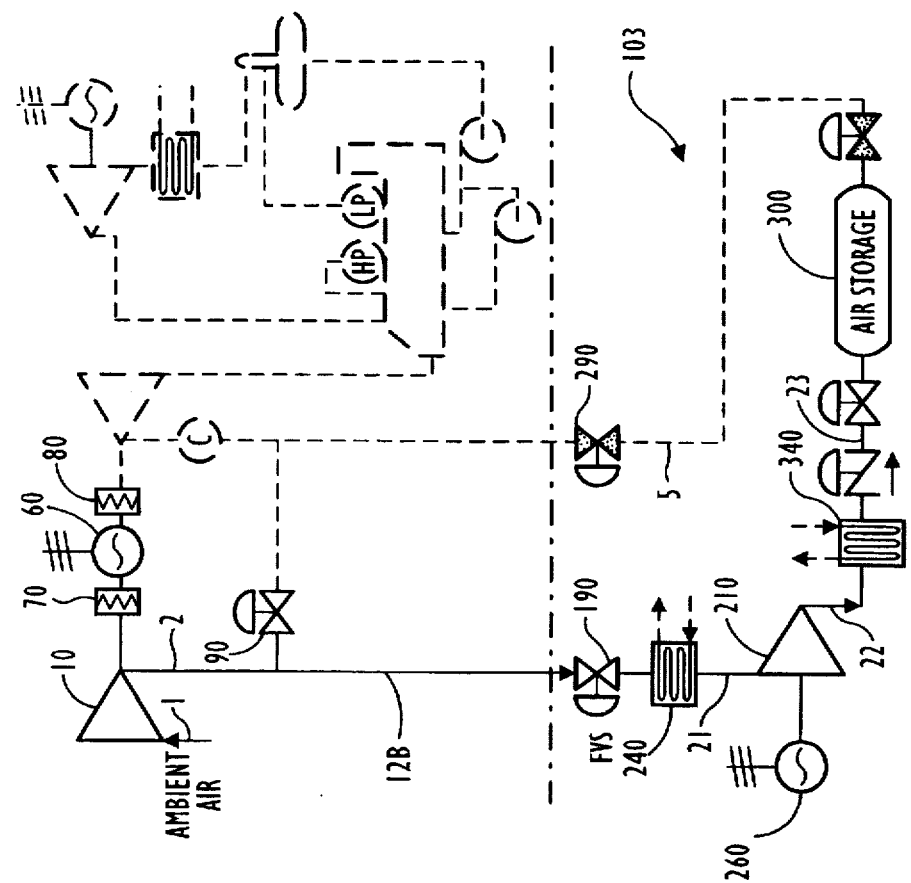
FIG. 3C is a schematic diagram of the system of FIG. 3, showing compressed air storage charging using off-peak energy (load management operation)
Figure 3B:
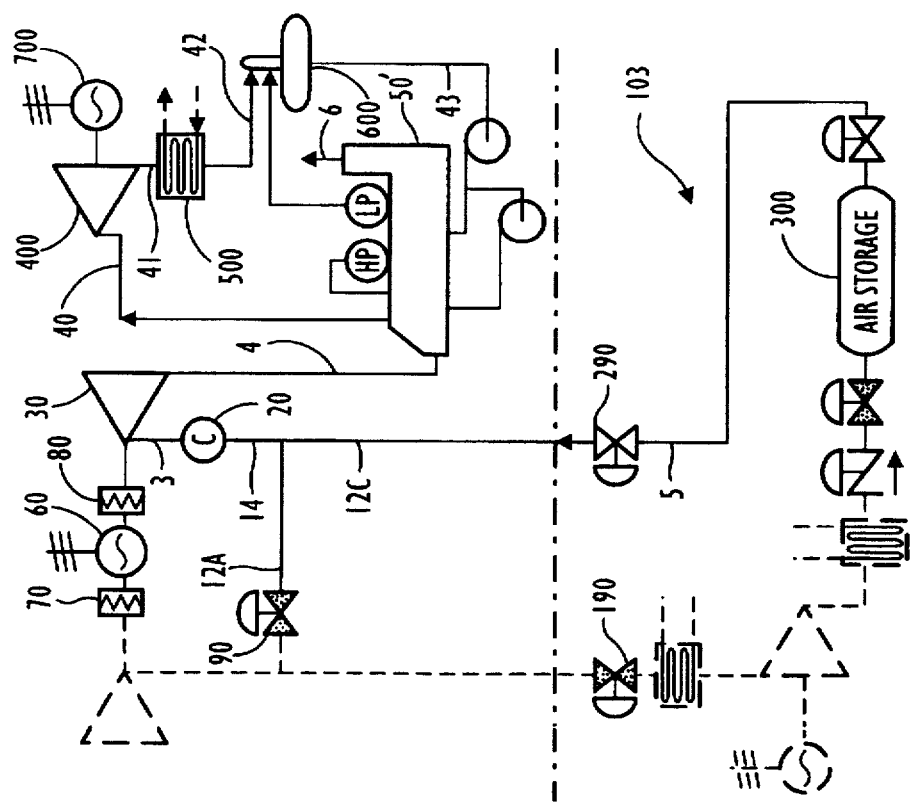
FIG. 3B is a schematic diagram of the system of FIG. 3, showing a peak/intermediate load operation.

FIG. 3 is a schematic diagram of a third illustrative embodiment of a HCTDPGS according to the present invention. FIGS. 3A, 3B, 3C, 3D and 3E illustrate the following operations of the third embodiment HCTDPGS, respectively: a base load operation, a peaking/intermediate operation, a storage recharging operation using off-peak energy from an electric grid (load management operation), a compressed air storage recharging by a stand-alone HCTDPGS, and alternative intermediate load operation.

The third embodiment of a HCTDPGS presents a modified CTDPGS - combined cycle plant, which, for illustrative purpose only, has a topping combustion turbine thermal cycle and a bottoming steam turbine cycle. The topping cycle could also be a generic multi-shaft combustion turbine with intercooling, reheat and recuperation with a multitude of components on each shaft. The modified combustion turbine power shaft (topping cycle) includes the compressor 10, the expansion turbine 30, the combustor 20, which feeds the heated combustion product gas to the expansion turbine 30, the double-ended motor/generator 60 with two automatic clutches ACC 70 and ATC 80. The expansion turbine 30 via engaged ATC 80 and ACC 70 drives the electric generator 60 and the compressor 10, respectively. The bottoming steam cycle consists of a heat recovery steam generator (HRSG) 50' which utilizes the expansion turbine 30 exhaust gas heat, a steam turbine 400, which is rigidly connected to an electric generator 700, a condenser 500 and a deaerator 600. It can be appreciated that if a recuperator is provided, such as shown in FIG. 1, the RSG 50' may be in communication with the exhaust gas from the lowest pressure turbine after the exhaust gas passes through the recuperator. The additional system 103 is identical to that of the first embodiment.

For the base load mode of operation, as shown on FIG. 3A, the plant operates as a typical combined cycle plant, with the following air and gas (topping cycle) and steam (bottoming cycle) flow paths: the air and gas path extends through the compressor 10 of the power shaft assembly 15, through the combustor 20 and then the expansion turbine 30 of the power shaft assembly; the closed-loop steam flow path extends from the HRSG 50', through the steam turbine 400, through the condenser 500, through the deaerator 600, through a boiler water feed pump and back to the HRSG 50'. Thus, the combustion turbine thermal cycle has the air and gas flow path, where the discharge 2 of the compressor 10 passes through the bypass structure 12A and the open TVS 90 as an input 14 to the combustor 20 and then is provided to the inlet 3 of the expansion turbine 30. The exhaust 4 of the low pressure expansion turbine 30 is utilized as a heat source for the HRSG 50', before going to the system exhaust 6. For the steam turbine bottoming cycle, the steam generated by the HRSG 50' is fed to the inlet 40 of the steam turbine 400, then via exhaust 41 is delivered to the condenser 500, and then via the path 42 to the deaerator 800 and via the boiler feed pump 44 is returned back to the HRSG 50'. The modified CTDPGS is disconnected by the air flow path from the additional ACCASS 101 since FVS 190 and SVS 290 are closed, and TVS 90 is open.

The base load operation mode requires automatic clutches ACC 70 and ACT 80 on the power shaft to be engaged; thus, the expansion turbine 30 via engaged ATC 80 is mechanically connected to the double-ended motor/generator 60 and the latter, via the engaged ACC 70, is mechanically connected to the compressor 10. The power generated by the expansion turbine 30 is partially consumed for driving the compressor 10 and the rest (minus losses) goes for the electric power motor/generator 60; the power generated by the steam turbine 400 goes for the electric power generator 700. The combined cycle-based HCTDPGS is optimized for the most efficient continuous base load operation, and, in spite of modifications, the plant has operating characteristics (electric power generated and efficiency) generally identical to the original combined cycle CTDPGS plant. Based on various practical and economic considerations, it is within the contemplation of the invention to have a multitude of combustion turbine power shafts and a variable number of compressors and expanders on each shaft in various arrangements.

For the HCTDPGS's peak/intermediate load operating mode, as shown on FIG. 3B, the air and gas flow path is originated with the compressed air stored in the compressed air storage 300 and flows through the combustor 20 and expansion turbine 30 of the power shaft assembly 15. Thus, the compressed air, stored in the storage 300, passes through the open SVS 290 via connection structure 12C to the inlet 14 of the combustor 20 and then is provided to the inlet 3 of the expansion turbine 30. The exhaust of the low pressure expansion turbine 30 is utilized as a heat source for the HRSG 50', before going to the system exhaust 6. The closed-loop steam flow path is identical to that for the base load operation. During the peak/intermediate load method of operation, the FVS 190, connecting the discharge 2 of the compressor 10 to the ACCASS 103, and the TVS 90, connecting the compressor 10 discharge 12 to the combustor inlet 14 are closed; and the SVS 290, connecting the air storage 300 to the connection structure 12C and the combustor inlet 14 is open. The peak/intermediate load operating mode requires a mechanical connection of the expansion turbine 30 to the electric motor/generator 60, via engaged ATC 80, and mechanical disconnection of the compressor 10 from the motor/generator 60, via disengaged ACC 70. Thus, during peak/intermediate operation, the power of the expansion turbine 30 (minus losses) goes for electric power generation (no power is used for compressor driving), the power generated by the steam turbine 400 (minus losses) also goes for an electric power generation. This results in a maximum peak/intermediate power generated by the HCTDPGS, which more than doubles the base load power rating of the original CTDPGS. The ACCASS 103 is optimized for specific peak/intermediate power and energy supply requirements and specific system economics, similar to the first and second embodiments. It is noted, that both the expansion turbine (with disconnected compressors) and the steam turbine have very flat efficiency vs. load curves, i.e. they will operate with very high efficiency over a whole range of intermediate loads up to the maximum peak load.

For a stand-alone HCTDPGS, which is not connected to the electric grid, the compressed air storage recharging mode of operation is shown in FIG. 3D, where the air flow path extends through the low pressure compressor 10 of the power shaft assembly 15, and at this point the air flow is divided into the storage recharging flow and the motive air flow. The storage recharging flow goes through the intercooler 240 and boost compressor 210 of the ACCASS 103, through the aftercooler 340 and into the air storage 300 while the motive air flow goes through the combustor 20 and expansion turbine 30 of the low pressure power shaft assembly 15. Thus, the discharge 2 of the compressor 10 is divided between a storage recharging air in flow path structure 12B and the motive air flow in bypass structure 12A. The storage recharging air flow path is as follows: the air goes through the open FVS 190 and flow path structure 12B, though the intercooler 240, the cooled air is then delivered to the inlet 21 of the boost compressor 210, and the boost compressor discharge 22 passes through an aftercooler 340 and connection 23, with a non-return isolation valve 24, into the compressed air storage 300. The motive air and gas flow path is as follows: the air goes through the open TVS 90, through the bypass structure 12A to the input 14 of the combustor 20 and is then provided to the inlet 3 of the expansion turbine 30. The exhaust 4 of the low pressure expansion turbine 30 is utilized as a heat source for the HRSG 50' before going to the system exhaust 6. The closed-loop steam flow path is identical to that for the base load operation. The minimum air flow via TVS 90 through the bypass structure 12A to the inlet to the combustor 20 is determined by a requirement for expansion turbine 30 and the steam turbine 400 to generate an electric power sufficient to drive the compressor 10, and the boost compressor 210. The remaining compressed air flow will go to the flow path structure 12B and via the open FVS 190 to the intercooler 240, the boost compressor 210 and via the aftercooler 340 to the compressed air storage 300.

The HCTDPGS's operating mode for the compressed air storage recharging with the use of off-peak energy from the electric grid (load management operation), as shown on FIG. 3C, has an air flow path, where the air extends through the compressor 10 of the power shaft assembly 15, through the intercooler 240 and boost compressor 210 of the ACCASS 103, through the aftercooler 340 and into the compressed air storage 300. Thus, the discharge 2 of the compressor 10 passes via flow path structure 12B through the FVS 190 to the intercooler 240. The cooled air is then delivered to the inlet 21 of the boost compressor 210, and the boost compressor discharge 22 passes through an aftercooler 340 and connection 23, with a non-return isolation valve 24, into the compressed air storage 300. During this operation the FVS 190 is open, while the SVS 290 and the TVS 90 are closed. The storage recharging operating mode requires mechanical disconnection of the expansion turbine 30 from the electric motor/generator 60 via disengaged ATC 80 and mechanical connection of the compressor 10 to the electric motor/generator 60 via engaged ACC 70. Also, both the electric motor/generator 60 and the electric motor 260 are connected to and fed by the electric grid. Thus, the electric motor/generator 60 and the electric motor 260 use low-cost off-peak energy (generated by large nuclear or coal fired plants with the lowest cost of electricity) for driving of the compressor 10 and the boost compressor 210, respectively, in order to recharge the air storage 300 to the maximum storage pressure.

For the alternative intermediate load mode of operation, as shown on FIG. 3E, the air and gas flow path is similar to that of the base load operation, the only differences are, that the compressor of the power shaft assembly operates at part load with a reduced air flow (controlled by inlet guide vanes (IGV, not shown) and/or other control means), and the expansion turbine 30, operating with the full power, is fed by both the compressed air flow delivered the compressor 10 and by the air flow from the compressed air storage 300. Accordingly, the steam turbine bottoming cycle is operating at fall power. Thus, the discharge 2 of the low pressure compressor 10 passes via the TVS 90 and the bypass structure 2A and, after being complemented at the coupling location by the stored air via the connection structure 12C, is provided as an input to the combustor 20. The stored air stream flows from the compressed air storage 300, through the SVS 290 and connection structure 12C and then is combined with the air flow through the bypass structure 12A upstream of the combustor 20. The outlet 3 of the combustor 20 is then provided to the inlet 3 of the expansion turbine 30. The exhaust 4 of the low pressure expansion turbine 30 is utilized as a heat source for the HRSG 50', before going to the system exhaust 6. The closed-loop steam flow path is identical to that for the base load operation. The control valve systems positioned as follows: the FVS 190 is closed; the SVS 290 and TVS 90 are open and positioned by a control system to provide a specified intermediate power output. The alternative intermediate load operation mode requires automatic clutches ACC 70 and ATC 80 to be engaged. Thus, similar to the base load operating mode, the expansion turbine 30, via engaged ATC 80, is mechanically connected to the double-ended motor/generator 60 and the latter via the engaged ACC 70, is mechanically connected to the compressor 10. The power generated by the expansion turbine 30 and the steam turbine 400 is partially consumed for driving the compressor 10 and the rest (minus losses) goes for an electric power generation by the motor/generator 60 and the generator 700. The major difference between the base load and the alternative intermediate load operations is that for the latter operation, the compressor 10 operates with a reduced air flow and, correspondingly, reduced power consumption, while the expansion turbine 30 is fed by a full motive air flow and produces full power. Thus, the electric generator 60 produces an electric power, which is higher than the base load power, being complemented by the full power of the steam turbine 400. The electric power delivered by a HCTDPGS over the range of intermediate loads is controlled by the positioning of the SVS 290, the TVS 90 and IGV (the FVS 190 is closed), all affecting the proportioning of the air flows upstream of the combustor 20: the higher the fraction of the flow from the storage 300, the higher the electric power output by the motor/generator. 60. The electric power of the steam turbine driven generator 700 is consistent with the power produced by the expansion turbine 30.

Figures 4B, 4C:
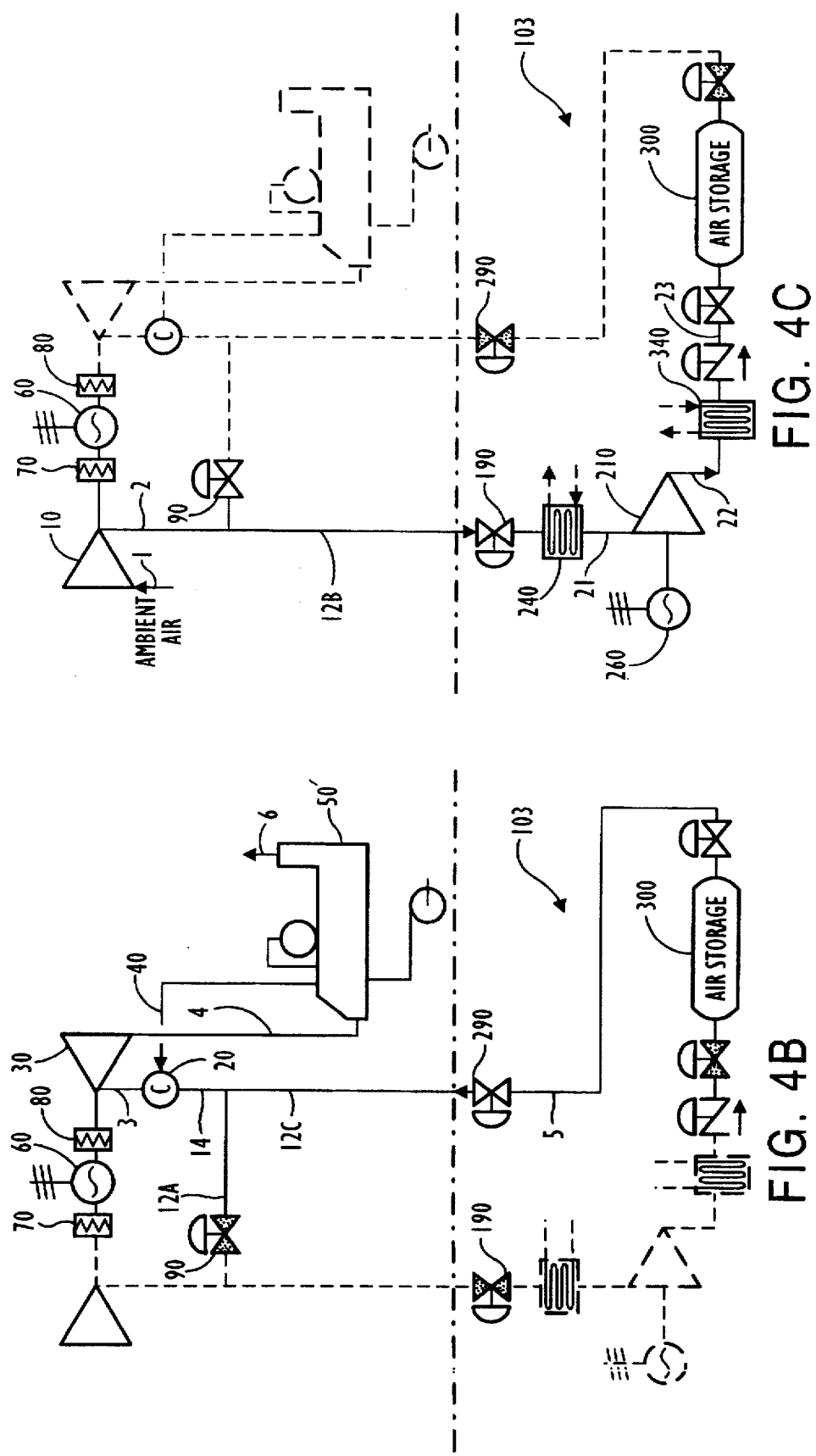
FIG. 4B is a schematic diagram of the system of FIG. 4, showing a peak/intermediate load operation.
FIG. 4C is a schematic diagram of the system of FIG. 4, showing compressed air storage charging using off-peak energy (load management operation)
Figure 4E:
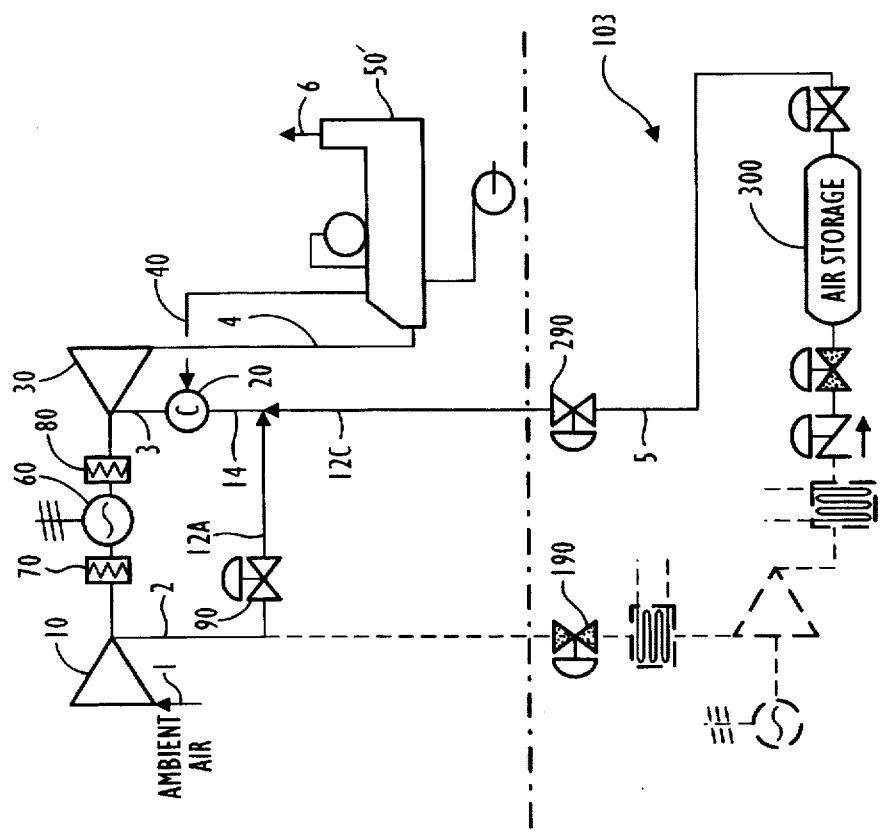
FIG. 4E is a schematic diagram of the system of FIG. 4, showing an alternative intermediate load operation.
Figure 4D:
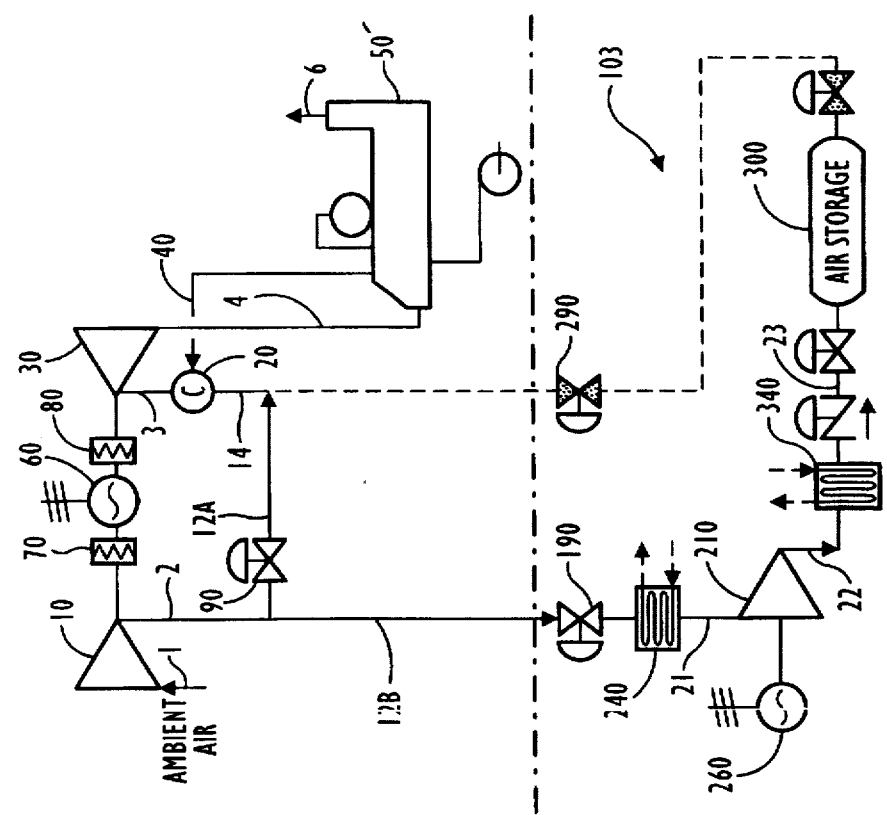
FIG. 4D is a schematic diagram of the system of FIG. 4, showing compressed air storage charging with a power generated by the HCTDPGS.

FIG. 4 is a schematic diagram of a fourth illustrative embodiment of a HCTDPGS, according to the present invention. The fourth embodiment of a HCTDPGS, for illustrative purpose only, is a simple cycle combustion turbine with steam injection. The combustion turbine could also be a generic multi-shaft combustion turbine with intercooling, reheat and recuperation with a multitude of components on each shaft. The modified combustion turbine power shaft (topping cycle) consists of the compressor 10, the expansion turbine 30, the combustor 20, which feeds the heated combustion product gas to the expansion turbine 30, the double-ended motor/generator 60 with two automatic clutches 70 and 80, the expansion 30, via engaged automatic clutches 80 and 70, drives the electric generator 60 and the compressor 10, respectively. The bottoming steam cycle consists of a heat recovery steam generator (HRSG) 50', utilizing the expansion turbine 30 exhaust gas heat and other auxiliary systems to support the steam generation and injection upstream and/or into the combustor 20 and the expander 30. The additional system is identical to that of the first embodiment. FIGS. 4A, 4B, 4C, 4D and 4E are self-explanatory and illustrate the following operations of a HCTDPGS, respectively: a base load operation, a peaking/intermediate operation, storage recharging operation using off-peak energy from an electric grid (load management operation), a compressed air storage recharging by a stand-alone HCTDPGS and an alternative intermediate load operation.

Thus, the inventive method and power generation system allows for a combustion turbine derivative power generation system to be modified and complemented with an additional air compression and compressed air storage system to provide, in the most cost-effective manner, a hybrid power generation system capable of a full scope of operations commonly provided by the four different power plant types: base-load, intermediate-load, peak-load and load-management plants. A major feature of the HCTDPGS concept and operating modes of the invention is that a combustion turbine derivative power generation system which is selected for the most efficient and cost-effective base load operation is also capable (by disengaging of at least one compressor of at least one power shaft assembly, and by using the compressed air stored in a compressed air storage system) of providing a peak power, which is approximately 200% of the base load rating, and providing intermediate load power over a whole a range of loads between a base load and a peak load. This peak/intermediate power is also delivered with the best efficiency possible, because the expander train operates at the design point (maximum peak power) or at various part loads (intermediate loads) with an efficiency only slightly lower than the best efficiency at design point, due to a very flat turbine efficiency vs. load curve (with a disengaged compressor). These relative base, intermediate and peak load power ratings of the HCTDPGS are almost typical for needs of the power generation industry. Any other prior art single power plant, in order to meet the same operational requirements, should have a nominal capacity to meet a peak power demand, thus most of the time during base load operations it operates with approximately 50% of a design capacity and therefore with a significantly reduced efficiency; similar considerations apply to intermediate load operations. These off-design operations of prior art plants significantly increase operating and maintenance costs. Also, significant capital savings could be expected for the hybrid concept of the invention, due to the HCTDPGS being selected to meet base load capacity requirement, while prior art power plants are selected to meet a maximum peak a requirement, which is typically 200% of a base load capacity.

TABLE 1a below presents performance characteristics of the first embodiment of the HCTDPGS (column 1), vs. two of the most logical alternatives—a single CTDPGS utilized as a basis for the first embodiment (column 2), and a single combustion turbine (column 3)—all selected to meet the same peak power requirements 18.2 MW. TABLE 1b presents major operating characteristics of the first embodiment of the HCTDPGS for four operations: base load, peak load, charging the compressed air storage using off-peak electric power from the grid and self-recharging the compressed air storage. For the purpose of a comparative analysis, the first embodiment of the HCTDPGS has the low pressure power shaft with compressor and turbine parameters (pressures, temperatures, flows and efficiencies) of the Allison KM7 combustion turbine and the high pressure shaft industrial compressor and turbine parameters provided by Dresser-Rand. Selection of particular cycle parameters has a minor effect on the results of the comparative analysis of merits of the hybrid concept and operating methods of the invention. An analysis of TABLE 1a shows that the HCTDPGS has significantly better efficiency and lower cost of electricity over a whole range of peak, intermediate and base loads. Thus, from TABLE 1a the first embodiment of the HCTDPGS, as compared to the identical, conventional CTDPGS, has lower cost of electricity (by 18%) for a peak power generation (2.3 c/kWh vs. 2.7 c/kWh), lower cost of electricity (by 26%) for a base load power generation (2.7 c/kWh vs. 3.4 c/kWh) and lower cost of electricity (by 29%) for an intermediate power generation (2.4 c/kWh vs. 3.1 c/kWh). TABLE 1a does not address an increased operating and maintenance cost for a prior art alternative, due to significant operations with off-design loads. The advantages are even more significant if HCTDPGS is compared to a combustion turbine (CT) (column 3).

TABLES 2a and 2b, 3a and 3b, and 4a and 4b describe performance and operating characteristics for the second, third and fourth embodiments of the invention, respectively, with selected prior art alternatives similar to those selected for TABLES 1a and 1b. These TABLES demonstrate that the second, third and fourth embodiments of the HCTDPGS have significant advantages over the prior art power plants and are consistent with the first embodiment.

TABLE 1a

|  | HCTDPCS 1 | CTDPGS 2 | CT 3 |
|---|---|---|---|
| Peak Load Operation | | | |
| Peak Load Power, MW | 18.2 | 18.2 | 18.2 |
| Heat Rate, Btu/kWh | 3,885 | 9,036 | 11,170 |
| Energy Ratio | 0.75 | n/a | n/a |
| Generation Cost, Cents/kWh* (Fuel + Energy) | 2.3 | 2.7 | 3.4 |
| Base Load Operation | | | |
| Base Load Power, MW | 7.7 | 7.7 | 7.7 |
| Heat Rate, Btu/kWh | 9,036 | 11,300 | 14,800 |
| Generation Cost, Cents/kWh* | 2.7 | 3.4 | 4.4 |
| Intermediate Load Operation | | | |
| Power (20% air from storage) | 10.2 | 10.2 | 10.2 |
| Gen. Heat Rate, Btu/kWh | 7,090 | 10,380 | 13,020 |
| Generation Cost, Cents/kWh* | 2.4 | 3.1 | 3.9 |

Note:
Fuel cost = $3.00 per MMBtu
Off-peak Energy Cost = $0.015 per kWh

TABLE 1b

|  | Base Load 1 | Peak Load 2 | Charging Using Grid Power 3 | Self Charging 4 |
|---|---|---|---|---|
| LP Power Shaft | | | | |
| LP Expander Power, MW | 13.5 | 13.5 | 0.0 | 9.5 |
| LP Compressor Power, MW | 8.5 | 0.0 | 8.5 | 8.5 |
| Generator Power, MW | 5.0 | 13.5 | 0.0 | 0.9 |
| LP Combustor Fuel Flow, lb/sec | 0.68 | 0.68 | 0.00 | 0.48 |
| HP Power Shaft | | | | |
| HP Expander Power, MW | 5.7 | 5.7 | 0.0 | 4.0 |
| HP Compressor Power, MW | 3.0 | 0.0 | 3.0 | 3.0 |
| Generator Power, MW | 2.7 | 5.7 | 0.0 | 1.0 |
| HP Combustor Fuel Flow, lb/sec | 0.30 | 0.30 | 0.00 | 0.21 |
| Additional System | | | | |
| Booster Compressor Power, MW | 0.0 | 0.0 | 1.8 | 0.5 |
| Storage Volume, Cu. Ft. | 90,500 | 90,500 | 0 | 0 |
| Maximum Storage Pressure, psia | n/a | 2135 | 2135 | 2135 |
| Minimum Storage Pressure, psia | n/a | 895 | 895 | 895 |
| Total Net Power | +7.67 | +18.2 | −13.3 | +1.4 |
| Hours of Peaking Power | n/a | 3 | — | — |
| Hours of Charging Cycle | n/a | 1 | 3 | 10.0 |

TABLE 2a

|  | HCTDPCS 1 | CTDPGS 2 | CT 3 |
|---|---|---|---|
| Peak Load Operation | | | |
| Peak Load Power, MW | 23.0 | 23.0 | 23.0 |
| Heat Rate, Btu/kWh | 5,175 | 7,800 | 9,300 |
| Energy Ratio | 0.52 | n/a | n/a |
| Generation Cost, Cents/kWh* (Fuel + Energy) | 2.3 | 2.3 | 2.8 |
| Base Load Operation | | | |
| Base Load Power, MW | 11.5 | 11.5 | 11.5 |
| Heat Rate, Btu/kWh | 7,800 | 8,580 | 11,625 |
| Generation Cost, Cents/kWh* | 2.3 | 2.6 | 3.5 |
| Intermediate Load Operation | | | |
| Power (20% air from storage) | 13.9 | 13.9 | 13.9 |
| Gen. Heat Rate, Btu/kWh | 6,437 | 8,190 | 10,370 |
| Generation Cost, Cents/kWh* | 2.2 | 2.5 | 3.1 |

Note:
Fuel cost = $3.00 per MMBtu
Off-peak Energy Cost = $0.015 per kWh

TABLE 2b

|  | Base Load 1 | Peak Load 2 | Charging Using Grid Power 3 | Self Charging 4 |
|---|---|---|---|---|
| LP Power Shaft | | | | |
| LP Expander Power, MW | 17.2 | 17.2 | 0.0 | 12.0 |
| LP Compressor Power, MW | 8.5 | 0.0 | 8.5 | 8.5 |
| Generator Power, MW | 8.7 | 17.2 | 0.0 | 3.5 |
| LP Combustor Fuel Flow, lb/sec | 0.78 | 0.78 | 0.00 | 0.48 |
| HP Power Shaft | | | | |
| HP Expander Power, MW | 7.2 | 7.2 | 0.0 | 5.0 |
| HP Compressor Power, MW | 3.0 | 0.0 | 3.0 | 3.0 |
| Generator Power, MW | 4.2 | 7.2 | 0.0 | 2.0 |
| HP Combustor Fuel Flow, lb/sec | 0.48 | 0.30 | 0.00 | 0.21 |
| Additional System | | | | |
| Booster Compressor Power, MW | 0.0 | 0.0 | 1.8 | 0.5 |
| Storage Volume, Cu. Ft. | n/a | 79,808 | 0 | 0 |
| Maximum Storage Pressure, psia | n/a | 2135 | 2135 | 2135 |
| Minimum Storage Pressure, psia | n/a | 895 | 895 | 895 |
| Total Net Power | +11.45 | +23.04 | −13.3 | 5.0 |
| Hours of Peaking Power | n/a | 3 | — | — |
| Hours of Charging Cycle | n/a | — | 2.6 | 8.8 |

TABLE 3a

|  | HCTDPCS 1 | CTDPGS 2 | CT 3 |
|---|---|---|---|
| Peak Load Operation | | | |
| Peak Load Power, MW | 15.9 | 15.9 | 15.9 |
| Heat Rate, Btu/kWh | 6,939 | 10,047 | 11,170 |

TABLE 3a-continued

|  | HCTDPCS 1 | CTDPGS 2 | CT 3 |
|---|---|---|---|
| Energy Ratio | 0.63 | n/a | n/a |
| Generation Cost, Cents/kWh* (Fuel + Energy) | 3.0 | 3.0 | 3.4 |
| Base Load Operation | | | |
| Base Load Power, MW | 7.9 | 7.9 | 7.9 |
| Heat Rate, Btu/kWh | 10,047 | 12,560 | 13,963 |
| Generation Cost, Cents/kWh* | 3.0 | 3.8 | 4.2 |
| Intermediate Load Operation | | | |
| Power (20% air from storage) | 9.7 | 9.7 | 9.7 |
| Gen. Heat Rate, Btu/kWh | 8,204 | 10,550 | 12,455 |
| Generation Cost, Cents/kWh* | 2.8 | 3.2 | 3.7 |

Note:
Fuel cost = $3.00 per MMBtu
Off-peak Energy Cost = $0.015 per kWh

TABLE 3b

|  | Base Load 1 | Peak Load 2 | Charging Using Grid Power 3 | Self Charging 4 |
|---|---|---|---|---|
| Power Shaft | | | | |
| Expander Power, MW | 17.2 | 17.2 | 0.0 | 12.0 |
| Compressor Power, MW | 8.5 | 0.0 | 8.5 | 8.5 |
| Generator Power, MW | 8.7 | 17.2 | 0.0 | 3.5 |
| Combustor Fuel Flow, lb/sec | 1.55 | 1.55 | 0.00 | 1.09 |
| Additional System | | | | |
| Booster Compressor Power, MW | 0.0 | 0.0 | 4.3 | 1.3 |
| Storage Volume, Cu. Ft. | 68,000 | 68,000 | 68,000 | 68,000 |
| Maximum Storage Pressure, psia | n/a | 1575 | 1575 | 1575 |
| Minimum Storage Pressure, psia | n/a | 208 | 208 | 208 |
| Total Net Power | +7.9 | +15.9 | −12.9 | 2.2 |
| Hours of Peaking Power | n/a | 3 | — | — |
| Hours of Charging Cycle | n/a | — | 2.5 | 8.3 |

TABLE 4a

|  | HCTDPCS 1 | CTDPGS 2 | CT 3 |
|---|---|---|---|
| Peak Load Operation | | | |
| Peak Load Power, MW | 15.4 | 15.4 | 15.4 |
| Heat Rate, Btu/kWh | 5,336 | 7,580 | 11,170 |
| Energy Ratio | 0.79 | n/a | n/a |
| Generation Cost, Cents/kWh* (Fuel + Energy) | 2.8 | 2.3 | 3.4 |
| Base Load Operation | | | |
| Base Load Power, MW | 7.1 | 7.1 | 7.1 |
| Heat Rate, Btu/kWh | 7,580 | 8,800 | 13,963 |
| Generation Cost, Cents/kWh* | 2.3 | 2.6 | 4.2 |

TABLE 4a-continued

|  | HCTDPCS 1 | CTDPGS 2 | CT 3 |
|---|---|---|---|
| Intermediate Load Operation | | | |
| Power (20% air from storage) | 8.9 | 8.9 | 8.9 |
| Gen. Heat Rate, Btu/kWh | 6,064 | 7,960 | 12,455 |
| Generation Cost, Cents/kWh* | 2.1 | 2.4 | 3.7 |

Note:
Fuel cost = $3.00 per MMBtu
Off-peak Energy Cost = $0.015 per kWh

TABLE 4b

|  | Base Load 1 | Peak Load 2 | Charging Using Grid Power 3 | Self Charging 4 |
|---|---|---|---|---|
| Power Shaft | | | | |
| Expander Power, MW | 13.0 | 13.0 | 0.0 | 9.1 |
| Compressor Power, MW | 8.5 | 0.0 | 8.5 | 8.5 |
| Generator Power, MW | 4.5 | 13.0 | 0.0 | 0.6 |
| Combustor Fuel Flow, lb/sec | 0.7 | 0.7 | 0.0 | 0.5 |
| Steam Turbine Power, MW | 2.6 | 2.6 | 0.0 | 1.8 |
| Additional System | | | | |
| Booster Compressor Power, MW | 0.0 | 0.0 | 3.2 | 1. |
| Storage Volume, Cu. Ft. | 79,300 | 79,300 | 79,300 | 79,300 |
| Maximum Storage Pressure, psia | n/a | 1575 | 1575 | 1575 |
| Minimum Storage Pressure, psia | n/a | 260 | 260 | 260 |
| Total Net Power | +7.1 | +15.4 | −11.8 | 1.4 |
| Hours of Peaking Power | n/a | 3 | — | — |
| Hours of Charging Cycle | n/a | — | 3 | 10.0 |

The major attractiveness of the inventive hybrid operating concept is in its originality, effectiveness and, most importantly, simplicity of implementation. A conventional CTDPGS can be any plant of any size, with only one condition - it shall be based on a combustion turbine: a simple cycle combustion turbine or a combustion turbine with reheat, intercooling, recuperation, humidification and steam injection, or a combined cycle plant. This includes the most commonly built power plant types. Modification of the conventional CTDPGS is relatively simple and inexpensive: it requires the positioning of the motor/generator with automatic clutches on both ends between a compressor and an expansion turbine (on two shafts for embodiments first and second, and on a single shaft for embodiments third and fourth). The additional ACCASS utilizes conventional boost compressor(s) and other commercial components, plus a compressed air storage. The air storage can be easily engineered using standard high pressure piping or vessels, or mined in hard rock, salt or aquifer underground geological formations. Sized for a base load operation, a HCTDPGS is operating at close to design capacity with the best efficiency during long base load and intermediate load hours of operation. Still, the HCTDPGS can produce a peak power, which is approximately 200% of base load, by disengaging compressors and by feeding expansion turbines with the stored compressed air. The compressed air storage can be easily refilled during off-peak hours either by power shaft and motor-driven boost compressors with a use of an inexpensive off-peak energy (thus, providing a load-management of base-load plants) or by self-charging.

The inventive method and system are particularly essential for small power producers including small utilities who could not afford to have specially dedicated plants for base load (coal, nuclear), intermediate load (combined cycle, smaller steam plants) and peak (combustion turbines) operations. These small power producers with a single or limited number of power plants should meet wide ranging short-term peak demands and long term intermediate/base load demands. The only practical alternative (to the invented hybrid plant and operating methods) they have is a selection of a power plants sized to meet maximum peak electric power requirements (associated with higher capital expenditures vs. a HCTDPGS selected for approximately 50% of a peak power requirements) and thus, the alternative plant operates most of the time at part loads with a significantly reduced efficiency.

It can be appreciated that a new hybrid system and method have been disclosed which allow a single combustion turbine derivative power generation system, modified, and complemented with an additional system, to provide, in the most efficient and cost-effective manner, a full scope of operations: base load operations, peak load operations with a maximum capacity of approximately 200% of the base load capacity, intermediate-load (load-following) operations and load-management operations commonly provided by the four different power plant types.

In a prior art plant, a CTDPGS has compressors of power shaft assemblies rigidly connected to turbines of the power shaft assemblies. Generators are rigidly connected to either the turbine or the compressor. In contrast to the prior art, a HCTDPGS of the invention has at least one double-ended motor/generator of a power shaft assembly connected on one end via an ACC to a compressor and on another end via an ATC to a turbine. This provides for three operating arrangements of a HCTDPGS: The first operating arrangement is when clutches (ACC and ATC) on both ends of motor/generators of power shaft assemblies are engaged—for a HCTDPGS operation as a conventional CTDPGS, where the turbines of the power shaft assemblies drive both the compressors and the motor/generators of the power shaft assemblies. Therefore, only approximately 50% of the power generated by the turbines of the power shaft assemblies will go for an electric power generation with the remaining power, approximately 50%, going for driving the compressors of the power shaft assemblies. The second operating arrangement is when the ACC between compressors and motor/generators of power shaft assemblies are disengaged and the ATC between turbines and motor/generators of power shaft assemblies are engaged. Thus, all power generated by the turbines of the power shaft assemblies is going for an electric power generation (without power losses for driving of at least one compressor). The third arrangement is when the ACC between the compressors and the motor/generators of the power shaft assemblies are engaged and the ATC between the turbines and the motor/generators of the power shaft assemblies are disengaged. Thus, all power of the electric motor/generators of the power shaft assemblies, fed by electric power from a grid, goes for driving at least one compressor of the power shaft assemblies and off-peak energy is used to electrically drive the motor driven boost compressor.

In a prior art CTDPGS, a turbine, with a combustor feeding the turbine of a power shaft assembly, is fed by compressed air provided by a compressor of a power shaft assembly. In contrast to the prior art, for a HCTDPGS, a turbine with a combustor feeding the turbine of a power shaft assembly, could be fed, optionally, either by a compressor of the power shaft assembly or by air stored in an additional compressed air storage system or by a combination of both sources.

In contrast to a prior art plant, a HCTDPGS can generate additional power exceeding the maximum base load power rating of a CTDPGS by approximately 100% (depending on the CTDPGS type), when a turbine, with a combustor feeding the turbine, of a power shaft assembly is provided with motive compressed air stored in an additional compressed air storage system when the turbine drives a motor/generator (via engaged ATC) and a compressor of the power shaft assembly is mechanically disconnected from the motor/generator (via the disengaged ACC). This additional peak/intermediate power eliminates a requirement to have an additional power generation unit dedicated exclusively to providing peak power during very limited hours when the peak power is needed.

The HCTDPGS is a stand-alone power generation plant sized for base load operation and is capable of providing short-duration peak/intermediate power, which is higher than base load power. The system is also capable of self-charging a compressed air storage during off-peak hours using power generated by a turbine of a power shaft assembly and without the use of grid electric power. This operation requires that a compressor of the power shaft assembly has the discharged compressed air being divided into a motive air flow to feed at least one turbine to ensure sufficient power to drive the compressor and to electrically drive the motor driven boost compressor and divided into a storage air flow to recharge the compressed air storage. Alternatively, in the case when the plant happens to be connected to a grid, in a manner similar to a CAES system, the HCTDPGS may provide use off-peak power from the electric grid to recharge the air storage with compressed air. Thus, in this alternative operation, the HCTDPGS provides for a better utilization of more efficient base-load power plants connected to the grid (improved load management) and for a more cost-effective process of air compression for storage and for later use for a peak/intermediate power generation.

In accordance with the invention, a new HCTDPGS power plant concept and new operating methods have been developed, which allow for a stand-alone plant to provide, in the most efficient and economical manner, the three different methods of operation: a base load power generation operation, a peak/intermediate load power generation operation and an air storage charging operation. In the prior art, these multiple operations are commonly provided by separate specialized base load power plants (commonly coal fired or nuclear plants), intermediate load plants (medium capacity steam plants, combined cycle plants, etc.), peak power plants (commonly combustion turbines) and load management plants (pump-hydro or CAES plants). A CTD-PGS power plant, presenting a basis for the HCTDPGS, includes a variety of combustion turbine thermal cycles, including a simple cycle combustion turbine plant, combustion turbine plants with intercooling, reheat, recuperation, chemical recuperation, steam injection and humidification, and combined cycle power plants. The newly developed HCTDPGS power plant is based on an original integration of commonly known components and systems, thus ensuring its practical implementation.

It has thus been seen that the objects of this invention have been fully and effectively accomplished. It will be realized, however, that the foregoing and preferred embodiments have been shown and described for the purposes of illustrating the structural and functional principles of the present invention, as well as illustrating the method of employing the preferred embodiments and are subject to change without departing from such principles. Therefore, this invention includes all modifications encompassed within the spirit of the following claims.

What is claimed is:

1. A method of providing a hybrid combustion turbine derivative power generation system including modifying a combustion turbine derivative power generation system sized for base load operation and having at least one power shaft assembly having at least one compressor, at least one expansion turbine and a generator; and a combustor feeding said turbine, said modification including (1) separating said compressor and said turbine, (2) replacing said generator with a double-ended motor/generator selected to meet peaking requirements, of said hybrid combustion turbine derivative power generation system and (3) placing said motor/generator between said compressor and said turbine, said motor generator having a turbine driving clutch structure on one end thereof and a compressor driving clutch structure on the other end thereof, said compressor driving clutch structure being operatively associated with said compressor so that said compressor is driven by said motor/generator when said compressor driving clutch structure is engaged and said turbine driving clutch structure being operatively associated with said turbine so that said motor/generator may be driven by said turbine when said turbine driven clutch structure is engaged, providing an additional compression and compressed air storage system comprising:
 a boost compressor,
 an intercooler feeding the boost compressor,
 an electric motor for driving the boost compressor,
 an aftercooler downstream of said boost compressor,
 a compressed air storage downstream of said aftercooler, integrating said modified combustion turbine derivative power generation system and said additional system to provide various flow paths through said hybrid system with
 a flow path structure permitting communication between an outlet of said compressor and an inlet to said intercooler feeding said boost compressor,
 a connection structure permitting communication between an outlet of said air storage and an inlet to the combustor,
 a bypass structure having a first end coupled to said flow path structure and a second end coupled to said connection structure, said bypass structure permitting communication between an output of said compressor of said at least one power shaft assembly and an inlet of said combustor, and
 valving to selectively control flow through said flow path structure, said connection structure and said bypass structure, the integration ensuring the provision of (i) a base load powers (ii) a peak load power which is greater than said base load power to meet peaking requirements, by using air from said air storage, (iii) an intermediate range of power loads between said base load power and said peak load power, by using air from said air storage or a combination of air from said air storage and said compressor, and (iv) a charging mode of operation wherein said air storage is charged with compressed air.

2. The method according to claim 1, wherein said valving includes a first valve system for controlling air flow in said flow path structure and disposed between said compressor and said intercooler feeding the boost compressor of said at least one power shaft assembly, a second valve system for controlling air flow in said connection structure and disposed between said air storage and said combustor, and a third valve system for controlling air flow in said bypass structure.

3. The method according to claim 2, further including a recuperator, downstream of a coupling location of said second end of said bypass structure and said connection structure and feeding said combustor.

4. The method according to claim 3, ensuring a base load power is provided when said turbine driving clutch structure and said compressor driving clutch structure of said at least one power shaft assembly are engaged such that said at least one turbine drives said motor/generator and said motor/generator drives said at least one compressor of said at least one power shaft assembly, said first and second valve systems are closed and said third valve system is open so as to define an air and gas flow path permitting air and gas to flow through said at least one compressor, through said bypass structure through the recuperator and to the combustor feeding said at least one turbine, and gas moves to the at least one turbine such that the difference between power generated by said at least one turbine and power consumed by said at least one compressor will be converted to electric power by said motor/generator and delivered to customers.

5. The method according to claim 3, ensuring a peak or intermediate load power is provided when said turbine driving clutch structure of said at least one power shaft assembly is engaged and said compressor driving clutch structure of said at least one power shaft assembly is disengaged such that said at least one turbine drives said motor/generator, said first and third valve systems are closed and said second valve system is open so as to define an air and gas flow path where compressed air stored in said air storage moves through said recuperator and to the combustor and gas moves to said at least one turbine of the at least one power shaft assembly such that substantially all power generated by said at least one turbine goes for electric power generation.

6. The method according to claim 3, wherein said charging mode includes a self-charging mode of operation when said turbine driving clutch structure and said compressor driving clutch structure of said at least one power shaft assembly are engaged such that said at least one turbine drives said motor/generator and said at least one compressor is driven by said motor/generator, said second valve system is closed and said first and third valve systems are open so as to define an air and gas flow path where compressed air from said at least one compressor is divided such that a portion of the air passes through the bypass structure through said recuperator to the combustor and gas moves to the at least one turbine of the at least one power shaft assembly and another portion of the air moves along said flow path structure and through said intercooler and is further compressed in said boost compressor and cooled in the aftercooler, the air compressed in the boost compressor is then charged into the air storage.

7. The method according to claim 3, wherein said charging mode is provided when said turbine driving clutch structure of said at least one power shaft assembly is disengaged and said compressor driving clutch structure of said at least one power shaft assembly is engaged such that said at least one compressor is driven by said motor/generator, said second and third valve systems are closed and said first valve system is open so as to define an air flow path where compressed air from said at least one compressor moves along said flow path structure and through said intercooler and is then further compressed in said boost compressor and cooled in the aftercooler, the compressed air thereafter is charged into the air storage, said motor/generator and said electric motor being coupled to and powered by an electric grid.

8. The method according to claim 3, ensuring an alternative intermediate load mode of operation is provided when air flow to said compressor of said at least one power shaft assembly is reduced and said turbine driving clutch structure and said compressor driving clutch structure of said at least one power shaft assembly are engaged such that said at least one turbine drives said motor/generator and said at least one compressor, operating at part load, is driven by said motor/generator, said first valve system is closed and said second and third valve systems are open so as to define an air and gas flow path where compressed air from said at least one compressor passes through the bypass structure and is combined with compressed air from said air storage at said coupling location, said combined air moves through said recuperator and to said combustor and then gas moves to the at least one turbine of said at least one power shaft assembly to produce a specified amount of intermediate power.

9. The method according to claim 1, further providing intercooling to reduce power consumption by a compressor of said at least one power shaft assembly.

10. The method according to claim 1, wherein said air storage is selected from the group consisting of: high pressure piping, at least one pressure vessel, concrete reinforced structures, and an underground geological formation.

11. The method according to claim 6, wherein the compressed air storage self-charging mode of operation includes controlling said first valve system and said third valve system to provide minimum air flow to the recuperator and then to the combustor, the combustor feeding gas to the at least one turbine to ensure that the at least one turbine has enough capacity to mechanically drive said at least one compressor and to electrically drive the boost compressor, and remaining air flow is directed for charging the air storage.

12. The method according to claim 3, further providing a water heater connected along a turbine exhaust flow path to an outlet of said recuperator to preheat water, and including a saturator being fed with hot water and disposed in a flow path generally at a location downstream of said coupling location where compressed air from a highest pressure compressor of said at least one power shaft assembly and compressed air from the air storage combines, such that compressed air from the highest pressure compressor, from the air storage, or from both the air storage and the highest pressure compressor, passes through said saturator and humidified, and air preheated by hot water, is sent to said recuperator.

13. The method according to claim 1, further providing a heat recovery steam generator to receive an exhaust of the lowest pressure turbine to recover exhaust gas heat for generating steam.

14. The method according to claim 1, further providing a steam turbine bottoming cycle with a heat recovery steam generator, said heat recovery steam generator being connected to said hybrid system to receive an exhaust gas of a lowest pressure turbine so as to recover an exhaust gas heat for generation of steam, steam being expanded through at least one steam turbine, condensed in at least one condenser, deaerated in a deaerator and returned back to said heat recovery steam generator.

15. A method of operating a hybrid combustion turbine derivative power generation system, said hybrid system including (1) a modified combustion turbine derivative power generation system sized for base load operation and having at least one power shaft assembly having at least one compressor, at least one expansion turbine, and a double-ended motor/generator between said compressor and said turbine, said motor/generator being selected to meet peak load requirements of said hybrid combustion turbine derivative power generation system and having a turbine driving clutch structure on one end thereof and a compressor driving clutch structure on the other end thereof, said compressor driving clutch structure being operatively associated with said compressor so that said compressor is driven by said motor/generator when said compressor driving clutch structure is engaged and said turbine driving clutch structure being operatively associated with said turbine so that said motor/generator may be driven by said turbine when said turbine driving clutch structure is engaged, and a combustor feeding said expansion turbine, and (2) an additional system selected to support peak and intermediate load requirements, said additional system having a boost compressor and an intercooler feeding cooled air to said boost compressor with an outlet of the compressor of the power shaft assembly being connected to an inlet of said intercooler via a flow path structure, an electric motor for driving said boost compressor, an aftercooler downstream of said boost compressor, a compressed air storage downstream of said aftercooler, a connection structure permitting communication between an outlet of said air storage and an inlet to the combustor, a first valve system for controlling air flow in said flow path structure and disposed between said compressor and said intercooler feeding the boost compressor, a second valve system for controlling air flow in said connection structure and disposed between said air storage and said combustor, a bypass structure having a first end coupled to said flow path structure and a second end coupled to said connection structure, said bypass structure permitting communication between an output of said compressor of said at least one power shaft assembly and an inlet of said combustor, and a third valve system for controlling air flow in said bypass structure, said hybrid system integrating said modified combustion turbine derivative power generation system and said additional system to provide base load power, and peak and intermediate load power, the method including:

controlling said valve systems to permit alternative flow path arrangements and controlling said clutch structures to (i) provide base load power, wherein said turbine driving clutch structure and said compressor driving clutch structure of said at least one power shaft assembly are engaged such that said at least one turbine drives said motor/generator and said motor/generator drives said at least one compressor of said at least one power shaft assembly, said first and second valve systems being closed and said third valve systems being open so as to define an air and gas flow path through the compressor, through said bypass structure through the combustor feeding said turbine, and to the turbine, and (ii) provide power increased from the base load for peak or intermediate load requirements, wherein said turbine driving clutch structure of said at least one power shaft assembly is engaged and said compressor driving clutch structure of said at least one power shaft assembly is disengaged such that said at least one turbine drives said motor/generator, said first and third valve systems being closed and said second valve system being open so as to define an air and gas flow path where compressed air stored in said air storage moves through said combustor to said at least one turbine of the at least one power shaft assembly.

16. The method according to claim 15, further including a recuperator, downstream of a coupling location of said second end of said bypass structure and said connection structure and feeding said combustor.

17. The method according to claim 16, wherein:
to provide said base load power, said air and gas flow path is such that compressed air moves through the at least one compressor, through said bypass structure, through the recuperator and the combustor feeding said at least one turbine, and to the at least one turbine, and to provide said increased peak or intermediate power, said air and gas flow path is such that compressed air stored in said air storage moves through said recuperator to the combustor and to said at least one turbine of the at least one power shaft assembly.

18. The method according to claim 16, further including controlling said valve systems to permit alternative flow path arrangements and controlling said clutch structures to enable:
a compressed air storage self-charging mode of operation, wherein said turbine driving clutch structure and said compressor driving clutch structure of said at least one power shaft assembly are engaged such that said at least one turbine drives said motor/generator and said at least one compressor is driven by said motor/generator, said second valve system being closed and said first and third valve systems being open so as to define an air and gas flow path where compressed air from said at least one compressor is divided such that a portion of the air passes through the bypass structure through the recuperator and combustor feeding the at least one turbine, and gas moves to the at least one turbine of the at least one power shaft assembly and another portion of the air moves along said flow path structure and through said intercooler and is further compressed in said boost compressor and cooled in the aftercooler, and the compressed air is charged into the air storage,
a compressed air storage charging using off-peak power mode of operation, wherein said turbine driving clutch structure of said at least one power shaft assembly is disengaged and said compressor driving clutch structure of said at least one power shaft assembly is engaged such that said at least one compressor is driven by said motor/generator, said second and third valve systems being closed and said first valve system being open so as to define an air and gas flow path where compressed air from said at least one compressor moves along said flow path structure and through said intercooler and is then further compressed in said boost compressor, cooled in the aftercooler and the compressed air is thereafter charged into the air storage, said motor/generator and said electric motor being coupled to and powered by an electric grid, and
an alternative intermediate load mode of operation, wherein air flow to said compressor of said at least one power shaft assembly is reduced and said turbine driving clutch structure and said compressor driving clutch structure of said at least one power shaft assembly are engaged such that said at least one turbine drives said motor/generator and said at least one compressor, operating at part load, is driven by said motor/generator, said first valve system being closed and said second and third valve systems being open so as to define an air and gas flow path where compressed air from said at least one compressor passes through the bypass structure and is combined with compressed air from said air storage, the combined air moves to said recuperator and to the combustor and gas moves to the at least one turbine of said at least one power shaft assembly to produce a specified amount of intermediate power greater than base load.

19. The method according to claim 15, further including intercooling to reduce power consumption by a compressor of said at least one power shaft assembly.

20. A hybrid combustion turbine derivative power generation system comprising:
a modified combustion turbine derivative power generation system sized for base load operation and having at least one power shaft assembly having at least one compressor, at least one expansion turbine, and a double-ended motor/generator between said compressor and said turbine, said motor/generator being connected directly to an electric grid and selected to meet peak load requirements of said hybrid combustion turbine derivative power generation system and having turbine driving clutch structure on one end thereof and a compressor driving clutch structure on the other end thereof, said compressor driving clutch structure being operatively associated with said compressor so that said compressor is driven by said motor/generator when said compressor driving clutch structure is engaged and said turbine driving clutch structure being operatively associated with said turbine so that said motor/generator may be driven by said turbine when said turbine driven clutch structure is engaged, and a combustor feeding said expansion turbine, and
an additional system selected to meet peak load requirements of said hybrid combustion turbine derivative power generation system and having a boost compressor, an intercooler feeding cooled air to said boost compressor, an electric motor for driving said boost compressor, and aftercooler downstream of said boost compressor, a compressed air energy storage downstream of said aftercooler,
said additional system being integrated with said modified combustion turbine derivative power generation system by a flow path structure permitting communication between an outlet of said at least one compressor and an inlet to the said intercooler feeding said boost compressor, a connection structure permitting communication between an outlet of said air storage and an inlet to the combustor, a bypass structure having a first end coupled to said flow path structure and a second end coupled to said connection structure, said bypass structure permitting communication between an output of said at least one compressor and an inlet of said combustor,
said hybrid system further including
a first valve system for controlling air flow in said flow path structure and disposed between said at least one compressor and an inlet to said intercooler feeding said boost compressor,
a second valve system for controlling air flow in said connection structure and disposed between said air storage and said combustor, and a third valve system for controlling air flow in said bypass structure, said valve systems being constructed and arranged to provide various flow paths through said system and said turbine driving clutch structure and said compressor driving clutch being constructed and arranged to provide via said motor/generator (i) a base load power (ii) a peak load power which is greater than said base load power to meet peaking requirements by using air from said air storage, and (iii) an intermediate range of power loads between said base load power and said peak load power by using air from said air storage or a combination of air from said air storage and said compressor, and a charging mode of operation wherein said air storage is charged with compressed air.

21. The hybrid system according to claim 20, further including a recuperator, downstream of a coupling location of said second end of said bypass structure and said connection structure and, feeding said combustor of said at least one power shaft assembly.

22. The hybrid system according to claim 20, further including at least one intercooler to reduce power consumption by a compressor of said at least one power shaft assembly.

23. The hybrid system according to claim 21, wherein base load power is provided when said turbine driving clutch structure and said compressor driving clutch structure of each of said at least one power shaft assembly are engaged such that said at least one turbine drives said motor/generator and said motor/generator drives said at least one compressor of said at least one power shaft assembly, said first and second valve systems are closed and said third valve system is open so as to define an air and gas flow path through the at least one compressor, through said bypass structure through the recuperator and to the combustor feeding said at least one turbine, and gas moves to the at least one turbine.

24. The hybrid system according to claim 21, wherein peak or intermediate power is provided when said turbine driving clutch structure of said at least one power shaft assembly is engaged and said compressor driving clutch structure of said at least one power shaft assembly is disengaged such that said at least one turbine drives said motor/generator, said first and third valve system are closed and said second valve system is open so as to define an air and gas flow path where compressed air stored in said air storage moves through said recuperator to said combustor feeding gas to said at least one turbine of the at least one power shaft assembly such that substantially all power generated by said at least one turbine goes for electric power generation.

25. The hybrid system according to claim 21, wherein said valve systems and clutches are controllable to provide a compressed air storage self-charging mode of operation wherein said turbine driving clutch structure and said compressor driving clutch structure of said at least one power shaft assembly are engaged such that said at least one turbine drives said motor/generator and said at least one compressor is driven by said motor/generator, said second valve system is closed and said first and third valve systems are open so as to define an air and gas flow path where compressed air from said at least one compressor is divided such that a portion of the air passes through the bypass structure to the recuperator and then to the combustor, the combustor feeding gas to the at least one turbine of the at least one power shaft assembly and another portion of the air moves along said flow path structure and through said intercooler and is further compressed in said boost compressor and cooled in the aftercooler, the air in said boost compressor is then charged into the air storage.

26. The hybrid system according to claim 21, wherein compressed air storage charging is provided when said turbine driving clutch structure of said at least one power shaft assembly is disengaged and said compressor driving clutch structure of said at least one power shaft assembly is engaged such that said at least one compressor is driven by said motor/generator, said second and third valve systems are closed and said first valve system is open so as to define an air flow path where compressed air from said at least one compressor moves along said flow path structure and through said intercooler and is then further compressed in said boost compressor and cooled in the aftercooler, the compressed air thereafter is charged into the air storage, said electric motor being coupled to and powered by the electric grid.

27. The hybrid system according to claim 21, wherein said valve systems and clutches are controllable to provide an alternative intermediate load mode of operation wherein air flow to said compressor of said at least one power shaft assembly is reduced and said turbine driving clutch structure and said compressor driving clutch structure of said at least one power shaft assembly are engaged such that said at least one turbine drives said motor/generator and said at least one compressor, operating at part load, is driven by said motor/generator, said first valve is closed and said second and third valves are open so as to define an air and gas flow path where compressed air from said at least one compressor passes through the bypass structure and is combined with compressed air from said air storage, said combined air moves to said recuperator to said combustor, the combustor feeding gas to said at least one turbine of said at least one power shaft assembly to produce a specified amount of power.

28. The hybrid system according to claim 21, further including providing a water heater connected along the turbine exhaust flow path to an outlet of said recuperator to preheat water, and including a saturator being fed with hot water and disposed in a flow path generally at a location downstream of said coupling location where compressed air from a highest pressure compressor of said at least one power shaft assembly and compressed air from the air storage combines.

29. The hybrid system according to claim 20, further including a heat recovery steam generator receiving an exhaust of a lowest pressure turbine to recover exhaust gas for generating steam.

30. The hybrid system according to claim 20, further including a steam turbine bottoming cycle with a heat recovery steam generator, said heat recovery steam generator being connected to said hybrid system to receive an exhaust gas of a lowest pressure turbine so as to recover an exhaust gas heat for generation of steam.

* * * * *